(12) United States Patent
Lee

(10) Patent No.: US 11,455,249 B2
(45) Date of Patent: Sep. 27, 2022

(54) STORAGE DEVICE FOR PERFORMING DUMP OPERATION, METHOD OF OPERATING STORAGE DEVICE, COMPUTING SYSTEM INCLUDING STORAGE DEVICE AND HOST DEVICE FOR CONTROLLING STORAGE DEVICE, AND METHOD OF OPERATING COMPUTING SYSTEM

(71) Applicant: SK hynix Inc., Icheon (KR)

(72) Inventor: Seok Jun Lee, Seoul (KR)

(73) Assignee: SK hynix Inc., Icheon (KR)

( * ) Notice: Subject to any disclaimer, the term of this patent is extended or adjusted under 35 U.S.C. 154(b) by 41 days.

(21) Appl. No.: 16/715,918

(22) Filed: Dec. 16, 2019

(65) Prior Publication Data

US 2021/0049096 A1 Feb. 18, 2021

(30) Foreign Application Priority Data

Aug. 16, 2019 (KR) .......................... 10-2019-0100561

(51) Int. Cl.
*G06F 12/06* (2006.01)
*G06F 12/02* (2006.01)

(52) U.S. Cl.
CPC ...... *G06F 12/0653* (2013.01); *G06F 12/0253* (2013.01); *G06F 2212/1044* (2013.01)

(58) Field of Classification Search
None
See application file for complete search history.

(56) References Cited

U.S. PATENT DOCUMENTS

| 8,255,613 | B2* | 8/2012 | Abali | G11C 29/76 711/103 |
| 2010/0161882 | A1* | 6/2010 | Stern | G06F 11/1008 711/103 |
| 2011/0161784 | A1* | 6/2011 | Selinger | G06F 11/1016 714/768 |
| 2012/0173792 | A1* | 7/2012 | Lassa | G06F 12/0246 711/103 |
| 2013/0138867 | A1* | 5/2013 | Craft | G06F 3/061 711/103 |
| 2014/0359382 | A1* | 12/2014 | Choi | G11C 29/82 714/710 |
| 2019/0079861 | A1* | 3/2019 | Amaki | G11C 29/42 |

FOREIGN PATENT DOCUMENTS

| KR | 101008576 B1 | 1/2011 |
| KR | 20110131714 A | 12/2011 |

* cited by examiner

*Primary Examiner* — Jared I Rutz
*Assistant Examiner* — Marwan Ayash

(57) ABSTRACT

Provided herein may be a storage device, a method of operating the storage device, a computing system including the storage device and a host device for controlling the storage device, and a method of operating the computing system. A memory controller may include a host interface configured to receive bad block information on one or more bad blocks of a second memory device from a host device; and a bad block processor configured to store data of one or more source bad blocks of the first memory device in one or more available memory blocks of the first memory device by controlling the first memory device, the source bad blocks of the first memory device corresponding to the bad block information, the available memory blocks being different from the source bad blocks.

14 Claims, 24 Drawing Sheets

STORAGE DEVICE FOR PERFORMING DUMP OPERATION, METHOD OF OPERATING STORAGE DEVICE, COMPUTING SYSTEM INCLUDING STORAGE DEVICE AND HOST DEVICE FOR CONTROLLING STORAGE DEVICE, AND METHOD OF OPERATING COMPUTING SYSTEM

CROSS-REFERENCE TO RELATED APPLICATION

The present application claims priority under 35 U.S.C. § 119(a) to Korean patent application number 10-2019-0100561, filed on Aug. 16, 2019, in the Korean Intellectual Property Office, the entire disclosure of which is incorporated herein by reference.

BACKGROUND

1. Technical Field

Various embodiments of the present disclosure generally relate to an electronic device, and more particularly, to a storage device, a method of operating the storage device, a computing system including the storage device and a host device for controlling the storage device, and a method of operating the computing system.

2. Related Art

A storage device is a device which stores data in a computing system. The storage device includes a memory device in which data is stored and a memory controller which controls the memory device. Memory devices are storage devices implemented using a semiconductor such as silicon (Si), germanium (Ge), gallium arsenide (GaAs), or indium phosphide (InP). Memory devices are generally classified into a volatile memory device and a nonvolatile memory device.

The volatile memory device loses data stored therein when power supply is interrupted. Representative examples of the volatile memory device include a static random access memory (SRAM), a dynamic RAM (DRAM), a synchronous DRAM (SDRAM), etc. The nonvolatile memory device retains data stored therein even when power supply is interrupted. Representative examples of the nonvolatile memory device include a read only memory (ROM), a programmable ROM (PROM), an electrically programmable ROM (EPROM), an electrically erasable programmable ROM (EEPROM), a flash memory, a phase-change RAM (PRAM), a magnetic RAM (MRAM), a resistive RAM (RRAM), a ferroelectric RAM (FRAM), etc. A flash memory is generally classified into a NOR type and a NAND type.

SUMMARY

Various embodiments of the present disclosure are directed to a storage device, a method of operating the storage device, a computing system including the storage device and a host device for controlling the storage device, and a method of operating the computing system, which support the efficient replacement of a storage device.

An embodiment of the present disclosure may provide for a memory controller for controlling a first memory device including a plurality of memory blocks. The memory controller may include a host interface configured to receive bad block information on one or more bad blocks of a second memory device from a host device; and a bad block processor configured to store data of one or more source bad blocks of the first memory device in one or more available memory blocks of the first memory device by controlling the first memory device, the source bad blocks of the first memory device corresponding to the bad block information, the available memory blocks being different from the source bad blocks.

An embodiment of the present disclosure may provide for a memory controller for controlling a memory device. The memory controller may include a host interface configured to receive a source device dump execution request from a host device; and a dump data chunk generator configured to generate a dump data chunk including a data chunk stored in the memory device and a physical address in response to the source device dump execution request, the physical address indicating a location at which the data chunk is stored in the memory device, and to provide the dump data chunk to the host device.

An embodiment of the present disclosure may provide for a method of operating a memory controller, the memory controller controlling a first memory device including a plurality of memory blocks. The method may include receiving bad block information on one or more bad blocks of a second memory device from a host device; and storing data of one or more source bad blocks of the first memory device in one or more available memory blocks of the first memory device by controlling the first memory device, the source bad blocks of the first memory device corresponding to the bad block information, the available memory blocks being different from the source bad blocks.

An embodiment of the present disclosure may provide for a method of operating a memory controller for controlling a memory device. The method may include receiving a source device dump execution request from a host device; generating a dump data chunk that includes a data chunk stored in the memory device and a physical address in response to the source device dump execution request, the physical address indicating a location at which the data chunk is stored in the memory device; and providing the dump data chunk to the host device.

An embodiment of the present disclosure may provide for a memory controller for controlling a memory device including a plurality of memory blocks. The memory controller may include a host interface configured to receive a target device initial operation request from a host device; and a target device dump operation controller configured to provide information on one or more bad blocks of the memory device to the host device in response to the target device initial operation request.

An embodiment of the present disclosure may provide for a memory controller for controlling a memory device. The memory controller may include a host interface configured to receive a target device dump execution request and a dump data chunk from a host device, the dump data chunk including data chunk; a write data generator configured to generate write data to be stored in the memory device and a physical address based on the dump data chunk, the physical address indicating a location at which the data chunk is to be stored in the memory device; and a write operation controller configured to store the write data in an area corresponding to the physical address by controlling the memory device.

An embodiment of the present disclosure may provide for a method of operating a memory controller, the memory controller controlling a memory device including a plurality of memory blocks. The method may include receiving a target device initial operation request from a host device; and providing information on one or more bad blocks of the memory device to the host device in response to the target device initial operation request.

An embodiment of the present disclosure may provide for a method of operating a memory controller for controlling a memory device. The method may include receiving a target device dump execution request from a host device, receiving a dump data chunk that includes a data chunk and a physical address indicating a location at which the data chunk is to be stored in the memory device, and storing the data chunk in an area corresponding to the physical address.

An embodiment of the present disclosure may provide for a host device for controlling a target storage device and a source storage device, each of the target storage device and the source storage device having a plurality of memory blocks. The host device may include a dump preparation controller configured to receive bad block information on one or more bad blocks included in the target storage device from the target storage device, and provide the bad block information to the source storage device; a dump execution controller configured to receive a dump data chunk from the source storage device, the dump data chunk including data to be stored in the target storage device and a physical address indicating a location at which the data is to be stored in the target storage device, and to provide the dump data chunk to the target storage device; and a host buffer memory device configured to temporarily store the bad block information, or the dump data chunk, or both.

An embodiment of the present disclosure may provide for computing system. The computing system may include a first storage device; a second storage device configured to replace the first storage device; and a host device configured to control the first storage device and the second storage device, wherein each of the first storage device and the second storage device comprises a plurality of memory blocks, wherein the second storage device provides information on one or more bad blocks included in the second storage device to the host device, wherein the host device provides the information on the bad blocks to the first storage device, and wherein the first storage device stores data of one or more source bad blocks of the first storage device in one or more available memory blocks of the first storage device, the source bad blocks of the first memory device corresponding to the bad block information, the available memory blocks being different from the source bad blocks.

An embodiment of the present disclosure may provide for memory controller for controlling a first memory device including a plurality of memory blocks. The memory controller may include a target device dump operation controller configured to provide information on one or more bad blocks of the first memory device to a host device in response to a first request from the host device; and a source device dump operation controller configured to receive second information on one or more bad blocks of a second memory device in response to a second request from the host device, to store data of one or more source bad blocks of the first memory device in one or more available memory blocks of the first memory device that are different from the source bad blocks, the source bad blocks of the first memory device corresponding to the second information, and to process the source bad blocks as bad blocks of the first memory device.

DETAILED DESCRIPTION

Specific structural or functional descriptions in the embodiments of the present disclosure introduced in this specification are exemplified only for description of the embodiments of the present disclosure conforming to the concept of the disclosure. The embodiments of the present disclosure may be practiced in various forms, and embodiments of the present disclosure should not be construed as being limited to the embodiments described in the specification or application.

Various embodiments of the present disclosure will now be described more fully hereinafter with reference to the accompanying drawings, in which preferred embodiments of the present disclosure are shown, so that those of ordinary skill in the art can easily carry out the technical idea of the present disclosure.

Figure 1:
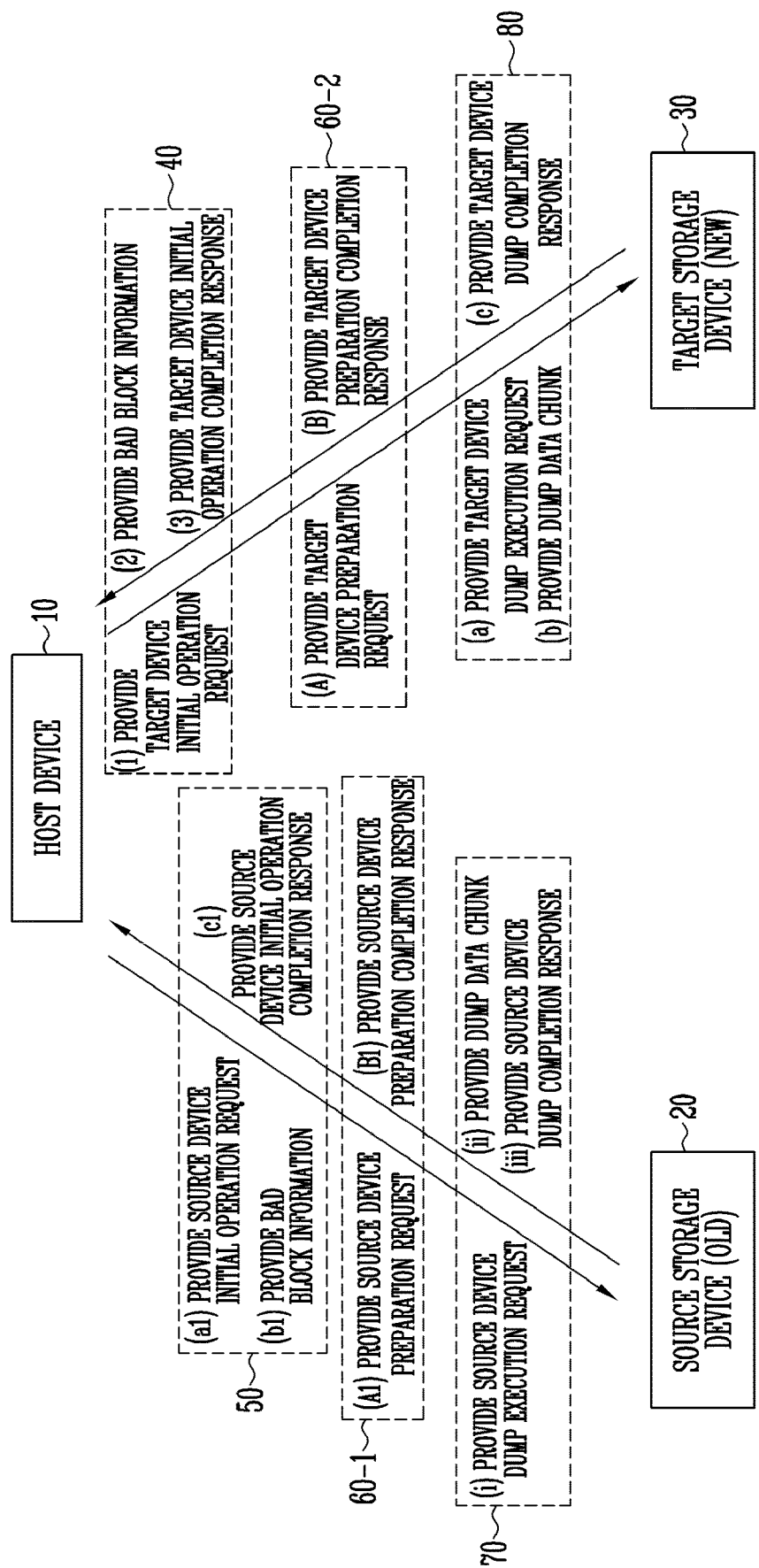
FIG. 1 is a diagram illustrating a computing system including a storage device according to an embodiment of the present disclosure.

FIG. 1 is a diagram illustrating a computing system including two storage devices 20 and 30 according to an embodiment of the present disclosure.

Referring to FIG. 1, the computing system may include a host device 10, a source storage device 20, and a target storage device 30.

The computing system may be an electronic device which is operated under the control of the host device 10, such as a mobile phone, a smartphone, an MP3 player, a laptop computer, a desktop computer, a game console, a television (TV), a tablet PC, or an in-vehicle infotainment system.

The storage device may be a device which stores data included in the computing system. The storage device may be manufactured as any one of various types of storage devices depending on a host interface that is a scheme for communication with the host device 10. For example, the storage device may be implemented as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device may be manufactured in any one of various types of package forms. For example, the storage device may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

Such a storage device has a limited lifespan. Therefore, the storage device having reached the end of its lifespan needs to be replaced with a new storage device. In FIG. 1, the storage device to be replaced may be a source storage device (OLD) 20. A storage device, which will be newly coupled to the host device 10, instead of the source storage device 20, may be a target storage device (NEW) 30.

The host device 10 may perform a dump operation of moving (or transferring) data stored in the source storage device 20 to the target storage device 30. A dump operation in a conventional computing system including a host device, a source storage device, and a target storage device is described below. The host device transfers a logical address and a read request to the source storage device so as to acquire the data stored in the source storage device. The source storage device searches for a physical address corresponding to the logical address and reads data stored at the searched physical address. The source storage device provides the read data to the host device. The host device may temporarily store the received data in a volatile memory included in the host device. The host device may provide a write request, a logical address, and the stored data to the target storage device so as to store the data acquired from the source storage device in the target storage device. The target storage device may translate the logical address into a physical address, and may store the data at the translated physical address.

When the size of the stored data is relatively small, a lot of time may not be consumed for performing the above-described dump operation in the conventional computing system. However, as the capacity of a storage device increases and the amount of data to be moved from the source storage device to the target storage device increases, a lot of time may be consumed for performing the above-described dump operation, because the source storage device and the target storage device of the conventional computing system each may need to translate a logical address into a physical address.

In accordance with an embodiment of the present disclosure, the host device 10 may move the data stored in the source storage device 20 to the target storage device 30 in a state in which a mapping relationship between the logical address and the physical address of the data stored in the source storage device 20 is maintained. That is, a physical address at the source storage device 20 of the data stored in the source storage device 20 may be identical to a physical address at the target storage device 30 after the stored data has been moved to the target storage device 30.

In an embodiment, the storage capacity of a single memory block included in the target storage device 30 may be identical to that of a single memory block included in the source storage device 20. Alternatively, the storage capacity of the target storage device 30 may be equal to or greater than that of the source storage device 20.

A dump operation according to an embodiment of the present disclosure is described as follows.

The dump operation may include an initial operation, a preparation operation, and a dump execution operation. The initial operation may include a target device initial operation 40 and a source device initial operation 50. The preparation operation may include a source device preparation operation 60-1 and a target device preparation operation 60-2. The dump execution operation may include a source device dump execution operation 70 and a target device dump execution operation 80. The dump operation may be performed in the sequence of the target device initial operation 40, the source device initial operation 50, the source device preparation operation 60-1, the target device preparation operation 60-2, the source device dump execution operation 70, and the target device dump execution operation 80.

The target device initial operation 40 may be an operation in which the host device 10 acquires bad block information of the target storage device 30 from the target storage device 30. In detail, the host device 10 may (1) provide a target device initial operation request to the target storage device 30. The target storage device 30 may (2) provide bad block information about one or more bad blocks included in the target storage device 30 to the host device 10 in response to the target device initial operation request provided from the host device 10. In an embodiment, the bad block information, provided by the target storage device 30 to the host device 10, may include the physical address of a corresponding bad block included in the target storage device 30. Thereafter, the target storage device 30 may (3) provide a target device initial operation completion response to the host device 10. In various embodiments, the bad block information provided by the target storage device 30 to the host device 10 may be a response to the target device initial operation request.

The source device initial operation 50 may be an operation in which the host device 10 provides the bad block information of the target storage device 30 to the source storage device 20. In detail, the host device 10 may (a1) provide a source device initial operation request to the source storage device 20. The host device 10 may (b1) provide the bad block information of the target storage device 30 to the source storage device 20. In an embodiment, the source device initial operation request and the bad block information may be provided together to the source storage device 20. The source storage device 20 may perform an initial operation based on the bad block information of the target storage device 30. In detail, the source storage device 20 may move valid data, stored in one or more memory blocks corresponding to identification information for identifying bad blocks included in the target storage device 30, to a different memory block (or an available memory block) in the source storage device 20. Specifically, these memory blocks of the source storage device 20 may be determined to correspond to the bad blocks of the target storage device 30 that are indicated by the identification information for identifying the bad blocks. In an embodiment, the identification information for identifying bad blocks may be physical addresses indicating the locations of bad blocks. For example, the source storage device 20 may move valid data, stored in one or more memory blocks of the source storage device 20 each having the same physical address as a corresponding bad block of the target storage device 30, to a different memory block in the source storage device 20. The source storage device 20 may (c1) provide a source device initial operation completion response to the host device 10.

The source device preparation operation 60-1 may be an operation that is performed by the source storage device 20 before the dump execution operation is performed. In detail, the host device 10 may (A1) provide a source device preparation request to the source storage device 20. The source storage device 20 may perform a preset source device preparation operation in response to the source device preparation request. The source device preparation operation will be described in detail later with reference to FIGS. 8, 9, and 18. When the source device preparation operation is completed, the source storage device 20 may provide (B1) a source device preparation completion response to the host device 10.

The target device preparation operation 60-2 may be an operation that is performed on the target storage device 30 before the dump execution operation is performed. The host device 10 may (A) provide a target device preparation request to the target storage device 30. The target storage device 30 may perform a preset target device preparation operation in response to the target device preparation request. The target device preparation operation will be described in detail later with reference to FIG. 19. When the target device preparation operation is completed, the target storage device 30 may (B) provide a target device preparation completion response to the host device 10.

The source device dump execution operation 70 may be an operation in which the host device 10 acquires a dump data chunk. In detail, the host device 10 may (i) provide a source device dump execution request to the source storage device 20. The source storage device 20 may generate a dump data chunk and (ii) provide the dump data chunk to the host device 10 in response to the source device dump execution request. The operation in which the source storage device 20 generates the dump data chunk will be described in detail later with reference to FIG. 12. When the operation of providing the dump data chunk to the host device 10 is completed, the source storage device 20 may (iii) provide a source device dump completion response to the host device 10.

The target device dump execution operation 80 may be an operation of storing the dump data chunk received from the host device 10 in the target storage device 30. First, the host device 10 may (a) provide a target device dump execution request to the target storage device 30. The host device 10 may (b) provide the dump data chunk to the target storage device 30. The target storage device 30 may store the received dump data chunk. A detailed method of storing the dump data chunk will be described in detail later with reference to FIGS. 13 and 14. After storing the dump data chunk, the target storage device 30 may (c) provide a target device dump completion response to the host device 10.

Figure 2:
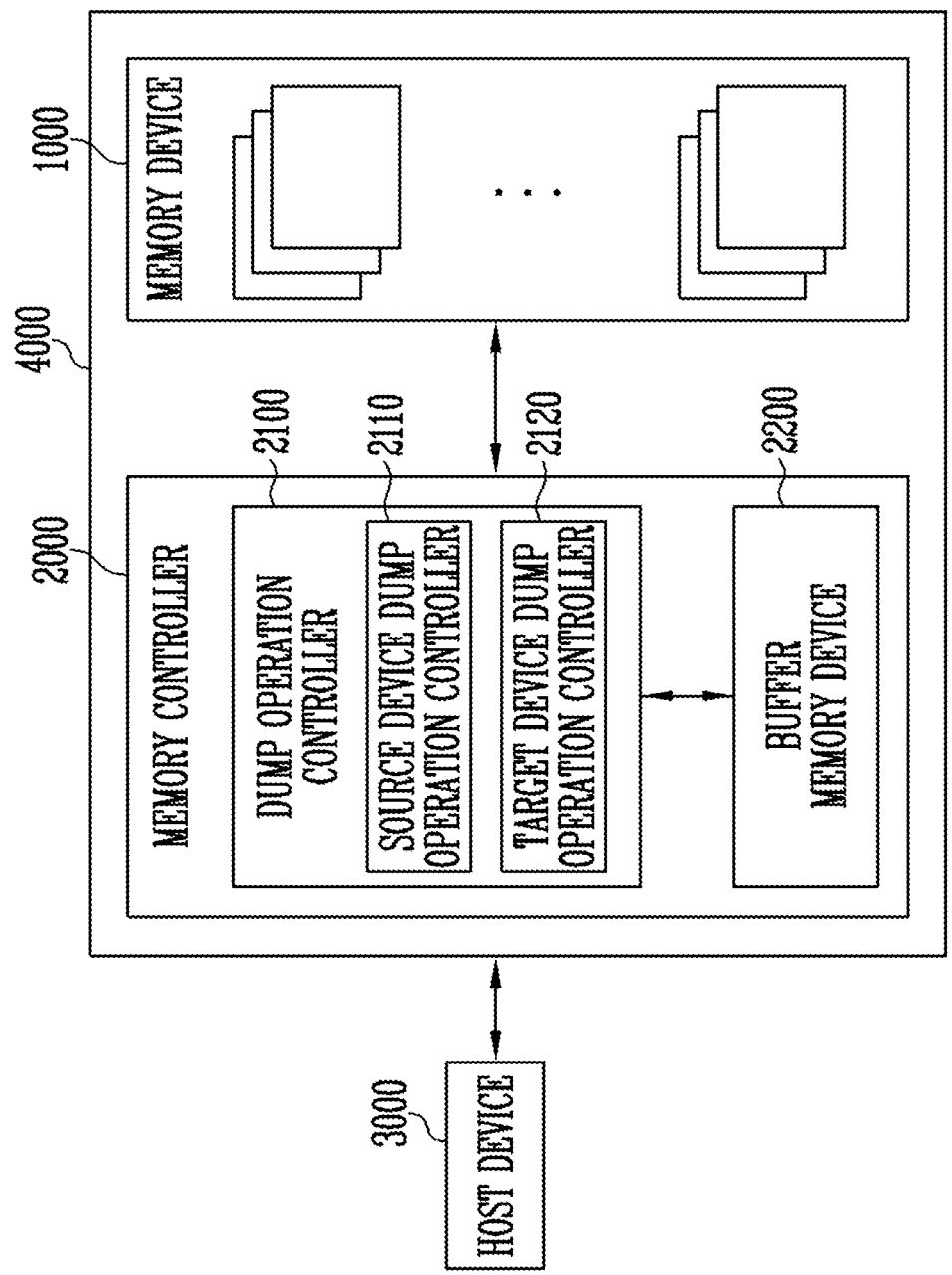
FIG. 2 is a block diagram illustrating the configuration of a storage device according to an embodiment of the present disclosure.

FIG. 2 is a block diagram illustrating the configuration of a storage device 4000 according to an embodiment of the present disclosure.

Referring to FIG. 2, the storage device 4000 may include a memory device 1000 and a memory controller 2000. The storage device 4000 may be any one of the source storage device 20 and the target storage device 30, described above with reference to FIG. 1. The memory controller 2000 may include a dump operation controller 2100 and a buffer memory device 2200. Although the buffer memory device 2200 is illustrated as being included in the memory controller 2000 in FIG. 2, but embodiments of the present disclosure are not limited thereto. For example, the buffer memory device 2200 may be included in the storage device 4000, and may be located outside the memory controller 2000 in various embodiments.

The memory device 1000 may store data. The memory device 1000 may operate in response to the control of the memory controller 2000. The memory device 1000 may include a memory cell array (not illustrated) including a plurality of memory cells which store data. The memory cell array (not illustrated) may include a plurality of memory blocks. A memory block may include a plurality of memory cells. Such a memory block may be a unit by which an erase operation of erasing data stored in the memory device 1000 is performed. In an embodiment, each memory block may include a plurality of pages. A page may be a unit by which a program operation of storing data in the memory device 1000 or a read operation of reading the data stored in the memory device 1000 is performed.

In an embodiment, the memory device 1000 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus DRAM (RDRAM), a NAND flash memory, a vertical NAND flash memory, a NOR flash memory, a resistive RAM (RRAM), a phase-change memory (PRAM), a magnetoresistive RAM (MRAM), a ferroelectric RAM (FRAM), or a spin transfer torque RAM (STT-RAM). In the present specification, for convenience of description, a description will be made on the assumption that the memory device 1000 is a NAND flash memory.

In an embodiment, the memory device 1000 may be implemented as a three-dimensional (3D) array structure. Embodiments of the present disclosure may also be applied not only to a flash memory device in which a charge storage layer is formed of a conductive floating gate (FG), but also to a charge trap flash (CTF) memory device in which a charge storage layer is formed of an insulating layer.

In an embodiment, each of the memory cells included in the memory device 1000 may operate as any one of a single-level cell (SLC) capable of storing one data bit, a multi-level cell (MLC) capable of storing two data bits, a triple-level cell (TLC) capable of storing three data bits, and a quad-level cell (QLC) capable of storing four data bits.

The memory controller 2000 may control the overall operation of the storage device 4000. When power is applied to the storage device 4000, the memory controller 2000 may run firmware (FW). The firmware (FW) may include a host interface layer (HIL) which receives a request input from a host device 3000 or outputs a response to the host device 3000, a flash translation layer (FTL) which manages an operation between the interface of the host device 3000 and the interface of the memory device 1000, and a flash interface layer (FIL) which provides a command to the memory device 1000 or receives a response from the memory device 1000.

When a write request is received from the host device 3000, the memory controller 2000 may receive data to be stored and a logical address (LA) for identifying the corresponding data from the host device 3000. The memory controller 2000 may translate the received logical address into a physical address (PA) indicating the physical locations of memory cells in which the data is to be stored, among the memory cells included in the memory device 1000. The memory controller 2000 may provide the memory device 1000 with a program command for storing data, the translated physical address, and the data to be stored.

When a read request is input from the host device 3000, the memory controller 2000 may receive a logical address for identifying data to be read from the host device 3000. The memory controller 2000 may acquire a physical address corresponding to the received logical address, and may provide a read command and the physical address to the memory device 1000. In various embodiments, during an erase operation, the memory controller 2000 may provide an erase command and a physical block address to the memory device 1000.

In an embodiment, the memory controller 2000 may perform a background operation. The background operation may be an operation that is performed on the memory device 1000 regardless of the request provided from the host device 3000. The background operation may be an operation that is performed so as to maintain the performance of the storage device 4000. The memory controller 2000 may control the memory device 1000 so that, regardless of the request from the host device 3000, a program operation, a read operation, or an erase operation is performed. For example, the memory controller 2000 may control the memory device 1000 so as to perform background operations, such as map update, wear leveling, garbage collection, and read reclaim operations.

The map update operation may be an operation of storing mapping information, which indicates a mapping relationship between a logical address provided from the host device 3000 and the physical address of the memory device 1000, in the memory device 1000.

The read reclaim operation may be an operation of moving data on which a predetermined number or more of read operations have been performed to a different memory block (or an available memory block).

The garbage collection operation may be a background operation that is performed so as to secure a given number of free blocks. The garbage collection operation may be an operation of moving valid data stored in a memory block, selected from among memory blocks included in the memory device 1000 according to a preset criterion, to a free block and erasing the selected memory block.

The wear-leveling operation may be an operation of moving data based on the number of erase operations performed on each of the memory blocks included in the memory device 1000 so that the memory blocks are uniformly used.

The dump operation controller 2100 may include a source device dump operation controller 2110 and a target device dump operation controller 2120. The source device dump operation controller 2110 may control a dump operation of a source storage device which is a storage device to be replaced. The target device dump operation controller 2120 may control a dump operation of a target storage device which is a storage device to replace the source storage device.

The buffer memory device 2200 may be a volatile memory device. The buffer memory device 2200 may include a metadata area which stores metadata. The metadata may be data required in order to maintain the performance of the storage device 4000. For example, the metadata may contain valid data information indicating whether the data stored in the memory device 1000 is valid data, or bad block information indicating information about bad blocks included in the memory device 1000, or both. In an embodiment, the metadata may include mapping information between a logical address provided by the host device 3000 and the physical address of the memory cells included in the memory device 1000.

The buffer memory device 2200 may temporarily store data that is processed when any one of a read operation, a write operation, a background operation, and a dump operation is performed under the control of the memory controller 2000.

Figure 3:
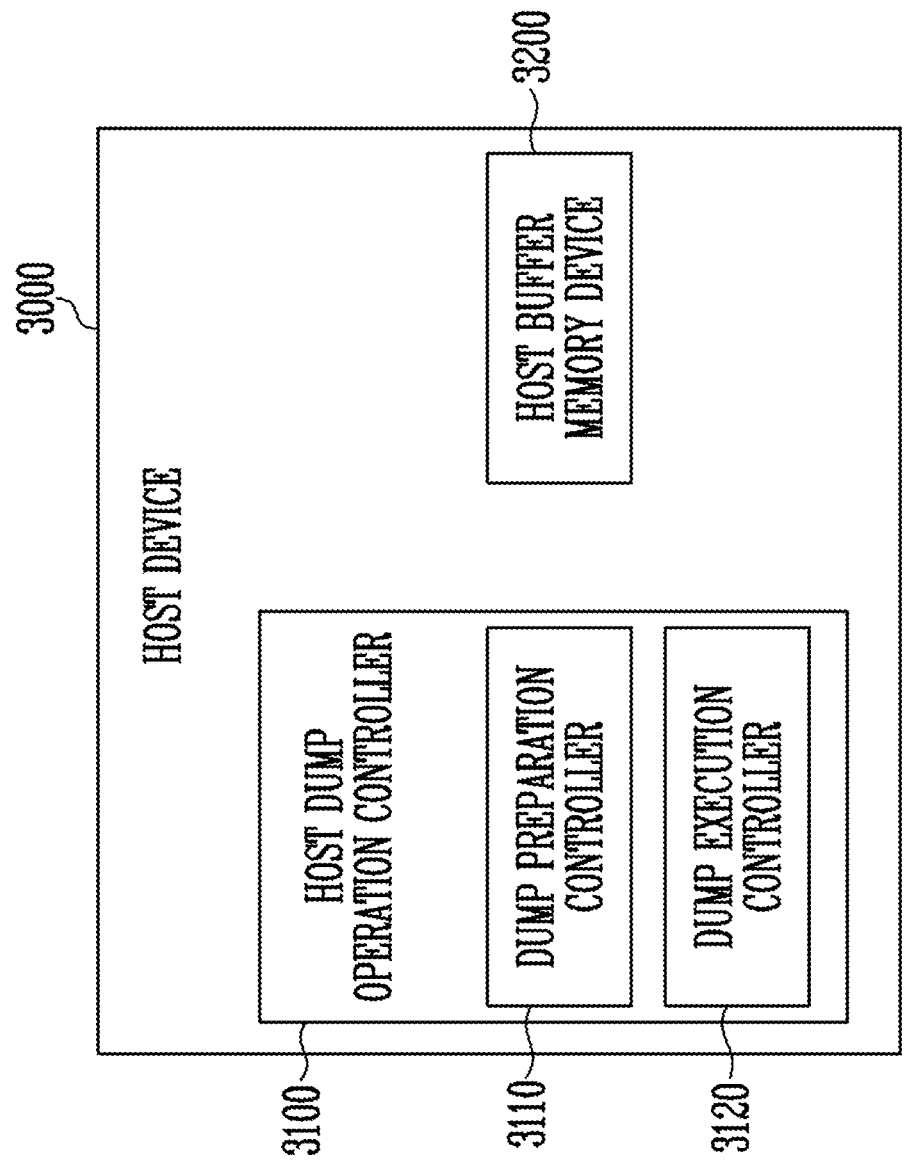
FIG. 3 is a block diagram illustrating the configuration of a host device of FIG. 2 according to an embodiment of the present disclosure.

FIG. 3 is a block diagram illustrating the configuration of the host device 3000 of FIG. 2 according to an embodiment of the present disclosure.

Referring to FIG. 3, the host device 3000 may include a host dump operation controller 3100 and a host buffer memory device 3200.

The host dump operation controller 3100 may include a dump preparation controller 3110 and a dump execution controller 3120.

The host dump operation controller 3100 may provide a plurality of requests related to the dump operation to the storage device 4000 illustrated in FIG. 2. In accordance with an embodiment of the present disclosure, the dump preparation controller 3110 may provide initial operation requests and preparation requests to the storage device 4000. The initial operation requests may include a source device initial operation request and a target device initial operation request. The preparation requests may include a source device preparation request and a target device preparation request. In response to the initial operation requests or the preparation requests received from the host device 3000, the dump operation controller 2100 illustrated in FIG. 2 may perform a related dump operation.

In an embodiment, the dump preparation controller 3110 may provide the target device initial operation request to the target storage device. The dump preparation controller 3110 may acquire bad block information of the target storage device which is provided by the target storage device in response to the target device initial operation request. The bad block information of the target storage device may be stored in the host buffer memory device 3200. In an embodiment, the dump preparation controller 3110 may receive a target device initial operation completion response from the target storage device in response to the target device initial operation request. In this case, the dump preparation controller 3110 may acquire together the bad block information of the target storage device and the target device initial operation completion response.

The dump preparation controller 3110 may provide the source device initial operation request to the source storage device. The dump preparation controller 3110 may provide the bad block information of the target storage device, together with the source device initial operation request, to the source storage device. Thereafter, the dump preparation controller 3110 may receive a source device initial operation completion response from the source storage device.

The dump preparation controller 3110 may provide the source device preparation request to the source storage device. In response to the source device preparation request, the source storage device may perform preparation operations required in order to perform a dump operation. When the dump preparation operations of the source storage device are completed, the dump preparation controller 3110 may receive a source device preparation completion response from the source storage device.

The dump preparation controller 3110 may provide the target device preparation request to the target storage device. In response to the target device preparation request, the target storage device may perform preparation operations required in order to perform a dump operation. When the dump preparation operations of the target storage device are completed, the dump preparation controller 3110 may receive a target device preparation completion response from the target storage device. In the above-described embodiment, the dump preparation controller 3110 may provide the source device preparation request to the source storage device, and then provide the target device preparation request to the target storage device. In another embodiment, the dump preparation controller 3110 may simultaneously provide the source device preparation request and the target device preparation request to the source storage device and the target storage device, respectively.

The dump execution controller 3120 may provide a source device dump execution request to the source storage device. The dump execution controller 3120 may acquire dump data from the source storage device. The dump data may be temporarily stored in the host buffer memory device 3200.

The dump execution controller 3120 may provide a target device dump execution request to the target storage device. Here, the dump execution controller 3120 may provide the dump data acquired from the source storage device to the target storage device.

The dump execution controller 3120 may respectively acquire a source device dump execution completion response and a target device dump execution completion response provided by the source storage device and the target storage device, respectively, in response to the source device dump execution request and the target device dump execution request.

Figure 4:
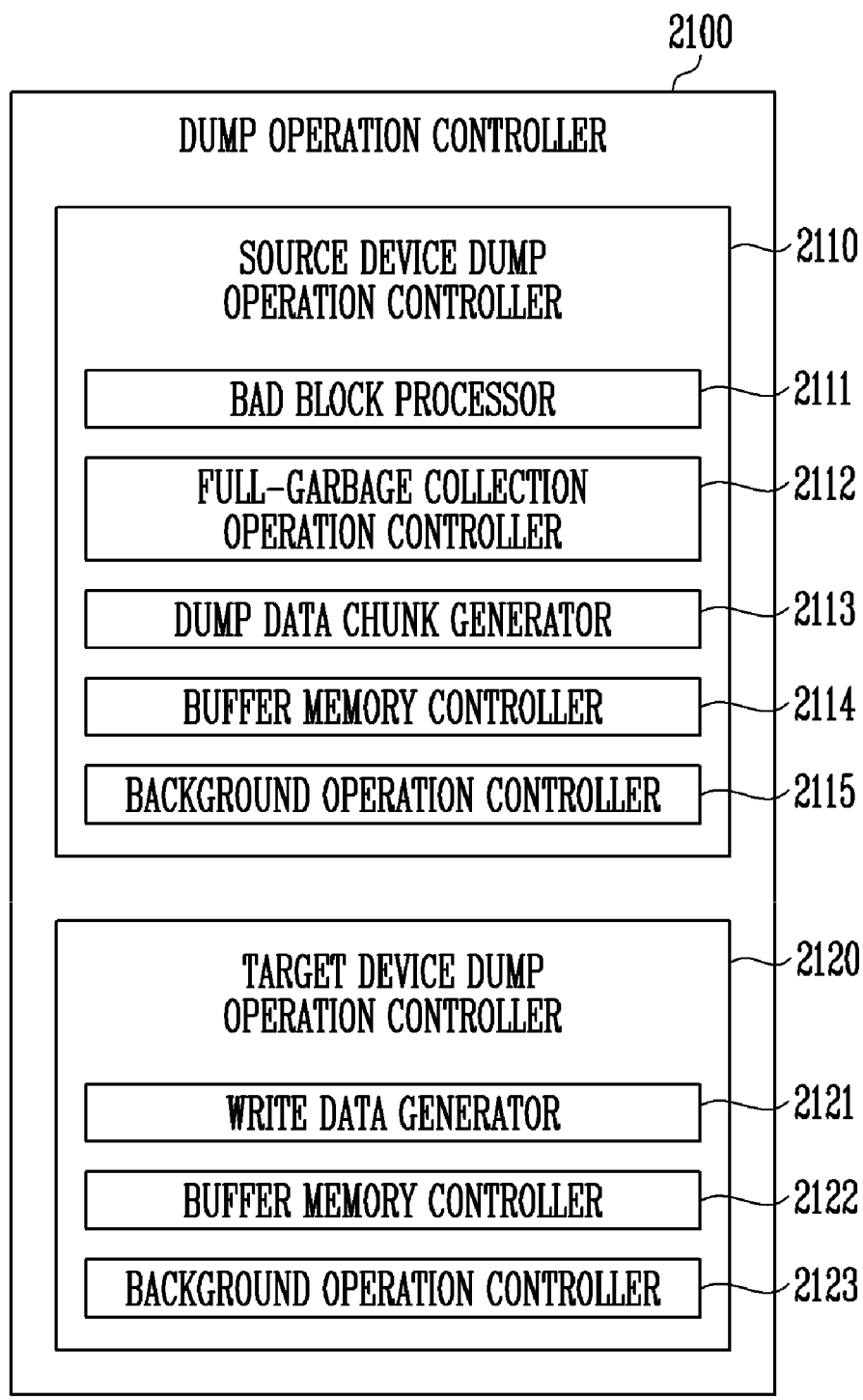
FIG. 4 is a block diagram illustrating the configuration of a dump operation controller of FIG. 2 according to an embodiment of the present disclosure.

FIG. 4 is a block diagram illustrating the configuration of the dump operation controller 2100 of FIG. 2 according to an embodiment of the present disclosure.

Referring to FIG. 4, the dump operation controller 2100 may include a source device dump operation controller 2110 and a target device dump operation controller 2120.

The source device dump operation controller 2110 may include a bad block processor 2111, a full-garbage collection operation controller 2112, a dump data chunk generator 2113, a buffer memory controller 2114, and a background operation controller 2115.

The bad block processor 2111 may set at least one memory block included in a memory device of a source storage device as at least one bad block based on bad block information received from a host device. The bad block information may be information about a bad block of an additional memory device different from the memory device included in the source storage device. For example, the bad block information may be information indicating physical addresses of bad blocks of one or more memory devices included in a target storage device. The bad block processor 2111 may move valid data stored in the memory blocks in the source storage device corresponding to the bad block information to a different memory block in the source storage device before setting the corresponding memory blocks as bad blocks.

The full-garbage collection operation controller 2112 may control a full-garbage collection operation that is performed on the source storage device. The full-garbage collection operation may be a garbage collection operation that is performed on all memory blocks included in the corresponding memory device. The garbage collection operation may be a background operation that is performed to secure a free block. In detail, the garbage collection operation may be an operation of storing valid data, among pieces of data stored in a victim block that is a memory block on which a garbage collection operation is to be performed among the memory blocks included in the memory device 1000, in a free block. The victim block may be used as a new free block through an erase operation.

In detail, the full-garbage collection operation controller 2112 may refer to valid data information stored in a metadata area of a buffer memory device 2200, which will be described later. The full-garbage collection operation controller 2112 may acquire a physical address indicating the location of the valid data stored in the memory device 1000. The full-garbage collection operation controller 2112 may provide the acquired physical address and a read command to the memory device 1000. The memory device 1000 may read the valid data stored in the memory device 1000 in response to the read command, and may provide the valid data to the buffer memory device 2200. The full-garbage collection operation controller 2112 may store the read valid data in a free block. The free block may be an empty memory block in which data is not present. When the full-garbage collection operation is completed, a plurality of pieces of the valid data that have been scattered and stored in a large number of memory blocks is stored in a small number of memory blocks, and thus the total number of free blocks may increase. When the full-garbage collection operation is performed, data to be moved to the target storage device, among the pieces of data stored in the source storage device, may be determined. That is, since invalid data does not need to be moved to the target storage device, the amount of data on which the dump operation is to be performed may be minimized.

The dump data chunk generator 2113 may generate a dump data chunk including the valid data stored in the memory device 1000 and the physical address indicating a location at which the valid data is stored in the memory device 1000. The generated dump data chunk may be provided to the host device 3000. The host device 3000 may provide the dump data chunk to a new storage device (or a target storage device). The target storage device may receive the dump data chunk, and may store data at the physical address contained in the dump data chunk.

Figure 5:
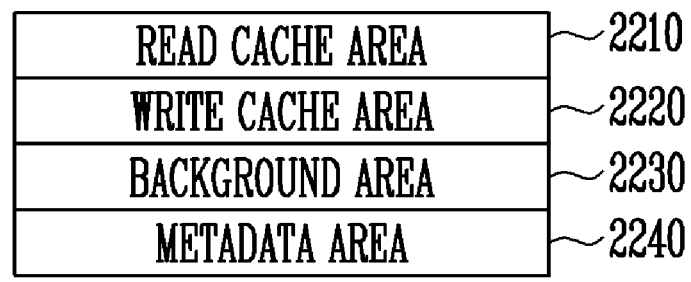
FIG. 5 is a diagram illustrating the configuration of a buffer memory device of FIG. 2 according to an embodiment of the present disclosure.

The buffer memory controller 2114 may control the operation of the buffer memory device 2200 of FIG. 2 included in the source storage device. Referring to FIGS. 2 and 5, the buffer memory controller 2114 may divide the buffer memory device 2200 into a read cache area 2210, a write cache area 2220, a background area 2230, and a metadata area 2240, and may control the operation of the buffer memory device 2200 under the control of the memory controller 2000. In detail, while a full-garbage collection operation, which will be described later, is being performed on the source storage device, the buffer memory controller 2114 may set the buffer memory device 2200 to an exclusive device for the full-garbage collection operation. Also, while a dump data chunk generation operation, which will be described later, is being performed on the source storage device, the buffer memory controller 2114 may set the buffer memory device 2200 to an exclusive device for a read operation.

The background operation controller 2115 may set the operation mode of a background operation, such as a map update, wear leveling, garbage collection, or read reclaim operation that is performed on the memory device 1000. In detail, while the full-garbage collection operation or the dump data chunk generation operation, which will be described later, is being performed on the source storage device, the background operation controller 2115 may set the background operation mode to a release mode.

The target device dump operation controller 2120 may include a write data generator 2121, a buffer memory controller 2122, and a background operation controller 2123.

The write data generator 2121 may generate data to be stored in a memory device, included in the target storage device, from the dump data chunk received from the host device. A detailed operation method thereof is described with reference to the drawings, which will be described later.

The buffer memory controller 2122 may control the operation of the buffer memory device 2200 included in the target storage device. In detail, the buffer memory controller 2122 may set the buffer memory device 2200 to an exclusive device for a write operation while write data is being stored in the target storage device.

The background operation controller 2123 may set the operation mode of a background operation, such as a map update, wear leveling, garbage collection, or read reclaim operation that is performed on the memory device 1000. More specifically, the background operation controller 2123 may set the background operation mode to a release mode while write data is being stored in the target storage device, which will be described later.

Detailed operating methods of the source device dump operation controller 2110 and the target device dump operation controller 2120 are described in detail with reference to the drawings, which will be described later.

FIG. 5 is a diagram illustrating the configuration of the buffer memory device 2200 of FIG. 2 according to an embodiment.

Referring to FIGS. 2 and 5, the buffer memory device 2200 may be a device which temporarily stores data while various operations are being performed on the memory device 1000 included in the storage device 4000.

The buffer memory device 2200 may include a read cache area 2210, a write cache area 2220, a background area 2230, and a metadata area 2240.

When the storage device 4000 receives a read request from the host device 3000, data stored in the memory device 1000 may be read. The read data may be temporarily stored in the buffer memory device 2200. Here, the read data may be temporarily stored in the read cache area 2210 included in the buffer memory device 2200.

When the storage device 4000 receives a write request from the host device 3000, write data requested to be written may be temporarily stored in the buffer memory device 2200 before the write data is stored in the memory device 1000. Here, the write data requested to be written may be stored in the write cache area 2220 included in the buffer memory device 2200.

The background area 2230 may be used for the background operation, such as the map update, wear leveling, garbage collection, or read reclaim operation that is performed on the memory device 1000. In detail, when the background operation is performed on the memory device 1000, the movement of data may be involved. In an embodiment, in order to perform the background operation, the memory controller 2000 may read existing data, and may temporarily store the read existing data in the background area 2230.

The metadata area 2240 may include valid data information indicating whether the data stored in the memory device 1000 is valid data, or bad block information indicating information about a bad block included in the memory device 1000, or both. In an embodiment, the metadata may be mapping information between a logical address provided by the host device 3000 and a corresponding physical address of the memory cells included in the memory device 1000.

Figure 6:
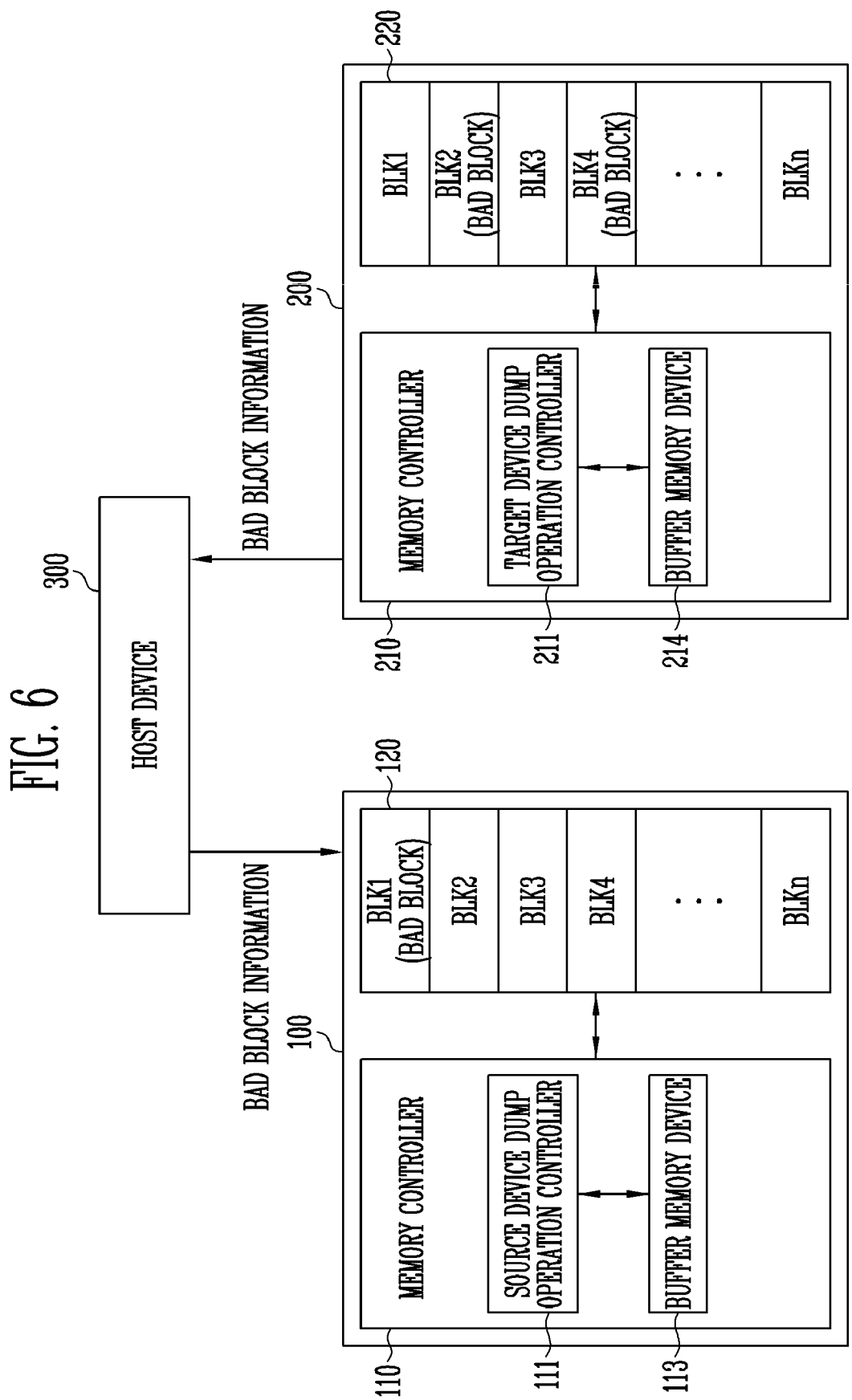
FIG. 6 is a diagram for explaining initial operations a dump operation according to an embodiment of the present disclosure.

FIG. 6 is a diagram for illustrating initial operations (e.g., a target device initial operation and a source device initial operation) of a dump operation according to an embodiment of the present disclosure.

Bad blocks may be included in a plurality of memory blocks included in a memory device. Such a bad block may occur due to various causes. Bad blocks may include a bad block occurring in a manufacturing stage and a bad block occurring in a usage process. For respective memory devices, the locations of bad blocks may differ. Therefore, in order to replace an old storage device with a new storage device, transferring data stored in the old storage device may be necessary such that data is not stored in a bad block of the new storage device.

Referring to FIG. 6, a target storage device 200 may include a memory controller 210 and a memory device 220. The memory controller 210 may include a target device dump operation controller 211 and a buffer memory device 214. The memory device 220 may include a plurality of memory blocks BLK1 to BLKn. The plurality of memory blocks BLK1 to BLKn may include one or more bad blocks. Such a bad block may be a block in which data cannot be normally stored due to various causes. The buffer memory device 214 and the memory device 220 may store information about bad blocks included in the memory device 220. The bad block information may include a physical address indicating the location of each bad block included in the memory device 220. The memory controller 210 may control the memory device 220 so that data is not stored in a memory block corresponding to a bad block based on the bad block information. In FIG. 6, it is assumed that a second block BLK2 and a fourth block BLK4 of the memory device 220 included in the target storage device 200 are bad blocks.

The host device 300 may provide a target device initial operation request to the target storage device 200. The target storage device 200 may receive the target device initial operation request and provide the bad block information contained in the memory device 220 to the host device 300.

In detail, the bad block information may be stored in a specific block (e.g., a content-addressable memory (CAM) block) of the memory device 220. When power is applied to the target storage device 200, the memory controller 210 may read the bad block information stored in the memory device 220 and then store the bad block information in the buffer memory device 214. Next, the target device dump operation controller 211 may provide the bad block information stored in the buffer memory device 214 to the host device 300 in response to the target device initial operation request.

The source storage device 100 may include a memory controller 110 and a memory device 120. The memory controller 110 may include a source device dump operation controller 111 and a buffer memory device 113. The memory device 120 may include a plurality of memory blocks BLK1 to BLKn. The plurality of memory blocks BLK1 to BLKn may include bad blocks. In an example, it is assumed that a first block BLK1 of the memory device 120 is a bad block. The host device 300 may provide a source device initial operation request to the source storage device 100. Also, the host device 300 may provide the bad block information about the second block BLK2 and the fourth block BLK4 of the memory device 220 received from the target storage device 200 to the source storage device 100. The information about the second block BLK2 and the fourth block BLK4 of the memory device 220 may be physical addresses indicating the locations of the memory blocks BLK2 and BLK4 of the memory device 220. The memory controller 110 may move the data stored in the second block BLK2 and the fourth block BLK4 of the source storage device 100 corresponding to the bad blocks BLK2 and BLK4 of the target storage device 200 to a different memory block (or an available memory block) of the memory device 120 in the source storage device 100 in response to the source device initial operation request.

Figure 7:
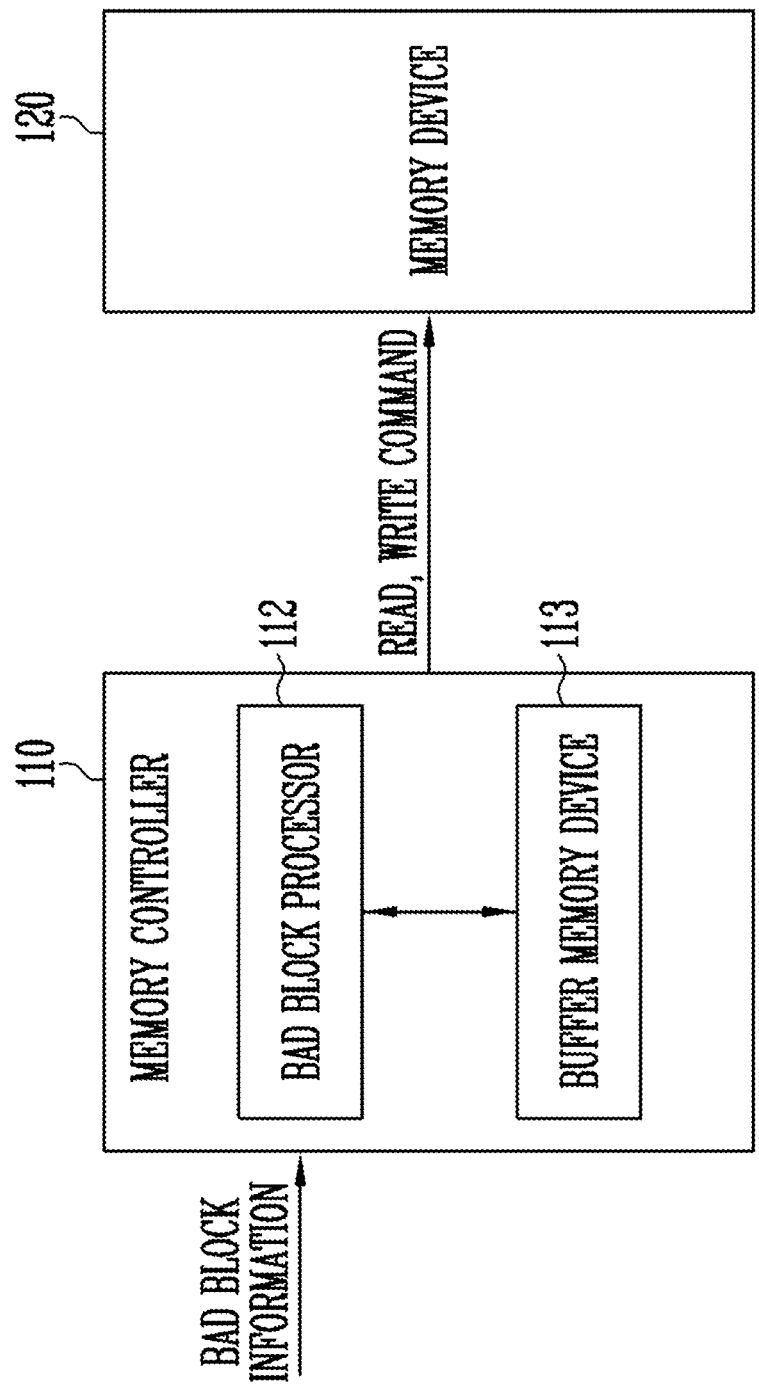
FIG. 7 is a diagram illustrating a method in which a memory controller processes a bad block of a source storage device using bad block information of a target storage device received from a host device, according to an embodiment of the present disclosure.

FIG. 7 is a diagram illustrating a method in which a memory controller 110 processes a bad block of a source storage device 100 using bad block information of a target storage device received from a host device.

Referring to FIG. 7, the memory controller 110 may include a bad block processor 112 and a buffer memory device 113. The buffer memory device 113 may include a metadata area which stores one or more of information about valid data, information about bad blocks, and logical to physical (L2P) mapping information, among pieces of data stored in the memory device 120. The information about valid data may include a physical address indicating a location at which the valid data is stored. The bad block information may include physical addresses indicating the locations of bad blocks. The logical-to-physical (L2P) mapping information may include logical addresses provided from the host device and physical addresses corresponding to respective logical addresses.

Referring to FIGS. 6 and 7, the memory controller 110 may move the valid data stored in memory blocks of the memory device 120 corresponding to the bad block information provided from the host device 300. In detail, the memory controller 110 may receive a source device initial operation request and the bad block information of the target storage device 200 from the host device 300 through a host interface. The bad block information may be identification information for identifying bad blocks included in the target storage device. In an embodiment, the identification information may be physical addresses indicating the locations of bad blocks. The bad block processor 112 may determine, using the buffer memory device 113, whether valid data is stored in a memory block having the same physical address as the bad block information of the target storage device 200 received from the host device 300. A memory block of the source storage device 100 having the same physical address as the bad block information of the target storage device 200 may be defined as a source bad block. For example, one or more source bad blocks of the source storage device 100 may be determined to respectively correspond to one or more bad blocks of the target storage device 200 that are indicated by the bad block information. When valid data is stored in the source bad block, the memory controller 110 may acquire a physical address, indicating the locations of memory cells in which the valid data is stored, with reference to the buffer memory device 113. The memory controller 110 may provide the acquired physical address of the source bad block and a read command to the memory device 120. The memory device 120 may perform a read operation of reading valid data in response to the read command received from the memory controller 110. The read valid data may be stored in the read cache area included in the buffer memory device 113.

The memory controller 110 may perform a write operation of storing the valid data, stored in the buffer memory device 113, in the memory device 120. At this time, the memory controller 110 may control the location of a memory block in which the valid data is to be stored. In detail, the memory controller 110 may control the memory device 120 so that the valid data is not stored in the bad blocks included in the memory device 120 and in source bad blocks. The memory device 120 may include bad blocks and normal blocks other than the bad blocks. The normal blocks may include writing-completed memory blocks in which data is stored and free blocks in which data is not stored. In an embodiment, the memory controller 110 may provide a write command and the valid data stored in the buffer memory device 113 to the memory device 120. Further, the memory controller 110 may provide the memory device 120 with physical addresses indicating free blocks other than the first block BLK1, which is the bad block of the source storage device, and the second block BLK2 and the fourth block BLK4, which are source bad blocks. The memory device 120 may store the valid data in the free blocks corresponding to the received physical addresses in response to the write command from the memory controller 110. The memory controller 110 may register the second block BLK2 and the fourth block BLK4 as bad blocks in the metadata area included in the buffer memory device 113. Therefore, the bad block information of the source storage device 100 may include information about the second block BLK2 and the fourth block BLK4, which are newly registered source bad blocks, and the first block BLK1, which is an original bad block. The updated bad block information may be stored in a specific memory block included in the memory device 120. That is, since the second block BLK2 and the fourth block BLK4, which were normal blocks, are considered as bad blocks, data is not stored in the blocks BLK2 and BLK4. Furthermore, since the valid data has been moved, logical to physical (L2P) mapping information stored in the metadata area of the buffer memory device 113 may be updated with physical addresses corresponding to the changed memory blocks. The information about the valid data stored in the metadata area of the buffer memory device 113 may also be updated with physical addresses corresponding to the changed memory blocks. After the bad block processing operation has been completed, the memory controller 110 may provide a source device initial operation completion response to the host device 300.

Figure 8:
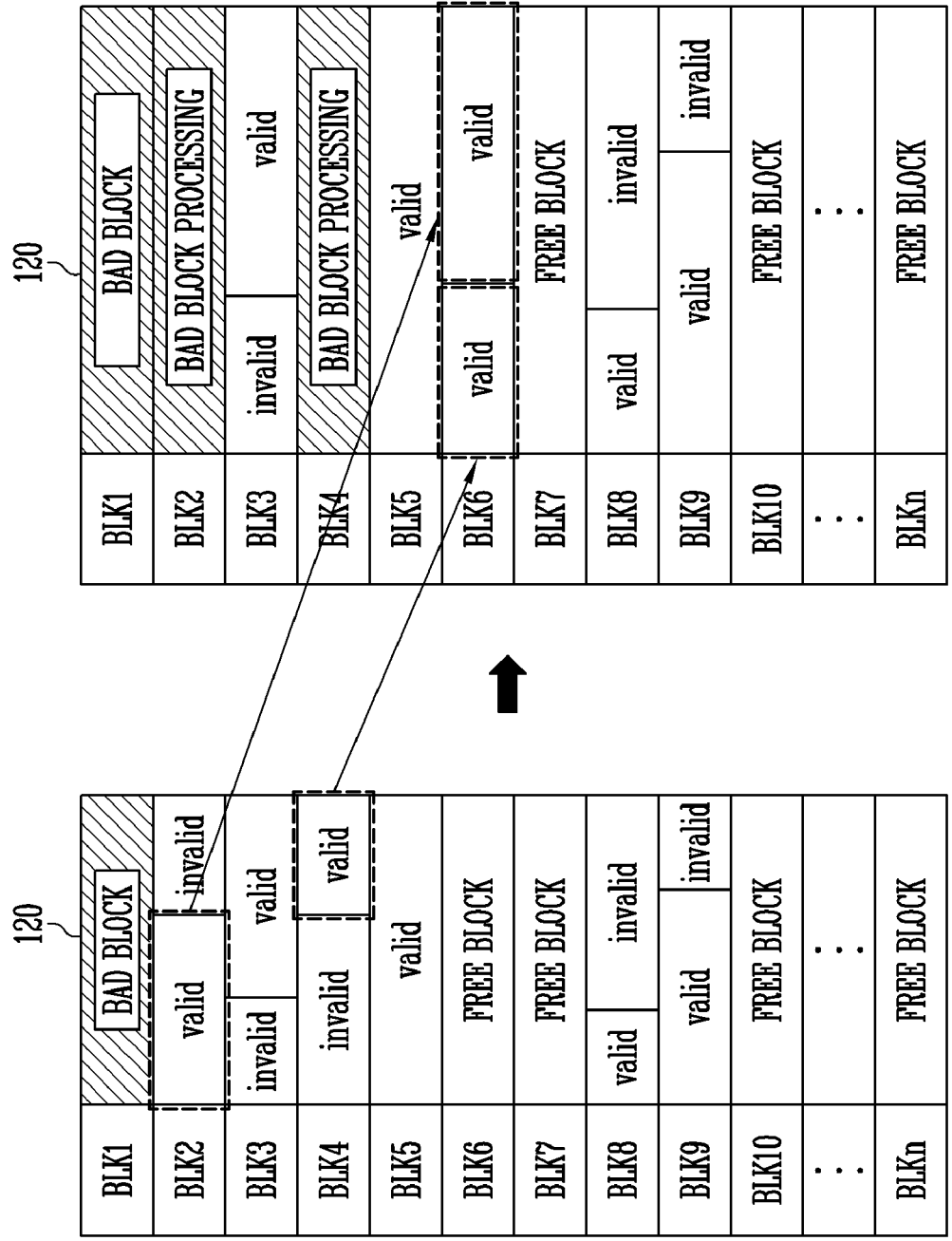
FIG. 8 is a diagram illustrating in detail the method of processing the bad block of the source storage device of FIG. 7 according to an embodiment of the present disclosure.

FIG. 8 is a diagram illustrating in detail the method of processing the bad block of the source storage device 100 of FIG. 7 according to an embodiment of the present disclosure.

Referring to FIG. 8, the memory device 120 may include a plurality of memory blocks BLK1 to BLKn. Some of the memory blocks BLK1 to BLKn each may include valid data, invalid data, or both. In detail, the first block BLK1 may include the bad block of the source storage device 100. The second block BLK2 to the fourth block BLK4 may be writing-completed memory blocks including both valid data and invalid data. The fifth block BLK5 may be a writing-completed memory block including the valid data. The sixth block BLK6 and the seventh block BLK7 may be free blocks to which data is not written. The eighth block BLK8 and the ninth block BLK9 may each be a writing-completed memory block including both valid data and invalid data. The tenth block BLK10 to the n-th block BLKn may be free blocks to which data is not written.

Referring to FIGS. 6 and 8, the host device 300 may provide physical addresses corresponding to the second block BLK2 and the fourth block BLK4, which are bad blocks of the target storage device 200, to the memory controller 110. The memory controller 110 may acquire the physical addresses of the valid data stored in the second block BLK2 and the fourth block BLK4 of the memory device 120 with reference to the information about the valid data stored in a metadata area. The memory controller 110 may provide the memory device 120 with a read command and a physical address so as to read the valid data stored in the second block BLK2 and the fourth block BLK4 of the memory device 120. The memory controller 110 may control the memory device 120 so that the read valid data is stored in one or more memory blocks other than the first block BLK1, the second block BLK2, and the fourth block BLK4. Each of these memory blocks in which the valid data is stored may be a free block.

Referring to FIGS. 7 and 8, the valid data stored in the second block BLK2 and the fourth block BLK4 may be stored in the sixth block BLK6 of the memory device 120. Next, the L2P mapping information stored in the metadata area may be updated with a physical address corresponding to the sixth block BLK6, and may then be stored in the metadata area of the buffer memory device 113. The information about the valid data stored in the metadata area may be updated with the physical address corresponding to the sixth block BLK6, and may then be stored in the metadata area. Further, the bad block processor 112 may set the source bad blocks as bad blocks. That is, in the bad block information stored in the metadata area, not only the first block BLK1 but also the second block BLK2 and the fourth block BLK4 may be written as bad blocks. Thereafter, the memory controller 110 may provide a source device initial operation completion response to the host device 300.

Figure 9:
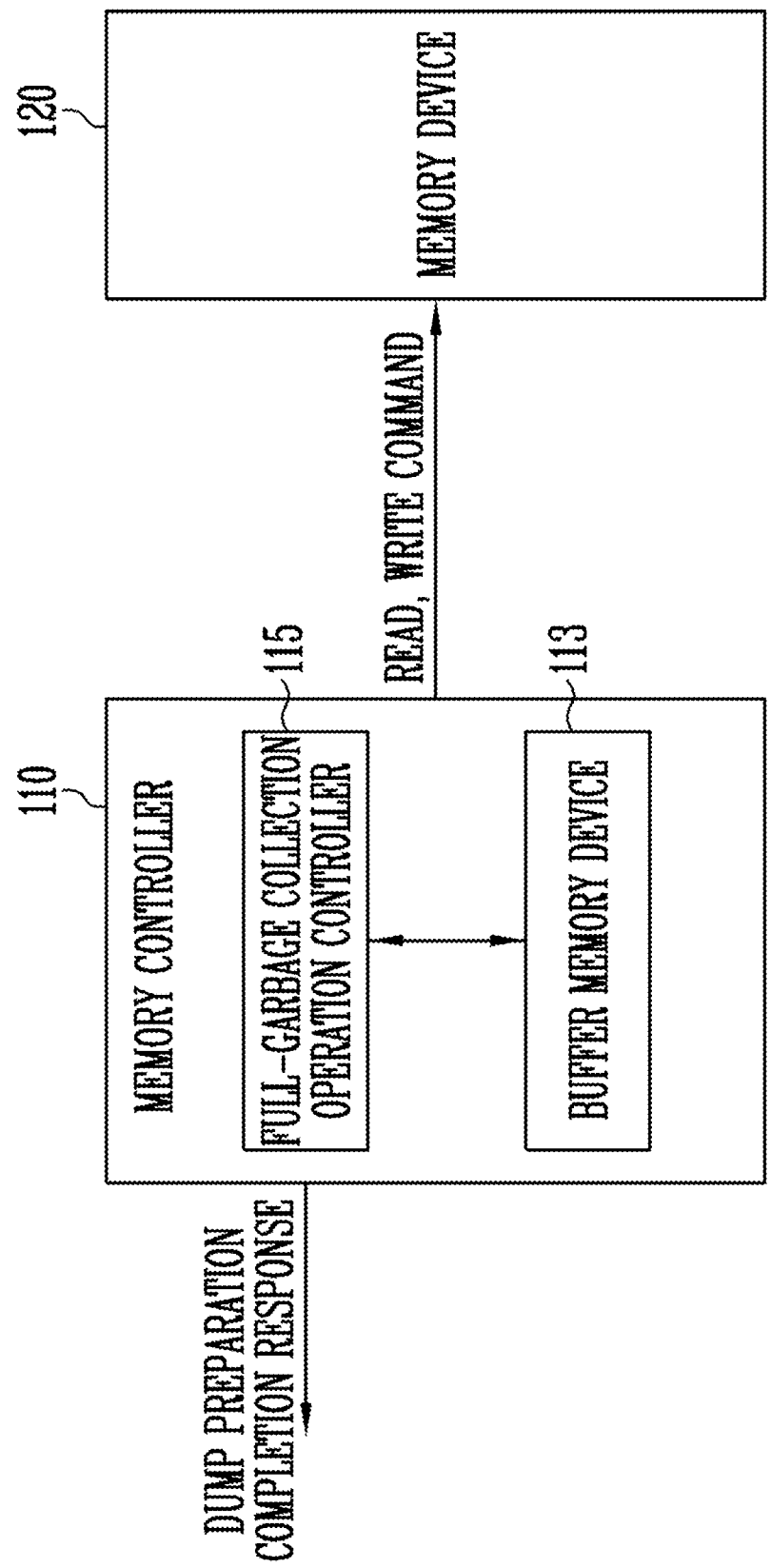
FIG. 9 is a diagram illustrating the structure of a source storage device which performs a full-garbage collection operation according to an embodiment of the present disclosure.

FIG. 9 is a diagram illustrating the structure of a source storage device 100 which performs a full-garbage collection operation according to an embodiment of the present disclosure.

Referring to FIG. 9, the memory controller 110 may include a full-garbage collection operation controller 115 and a buffer memory device 113.

A host device (e.g., the host device 300 in FIG. 6) may provide a source device preparation request to the source storage device 100. In response to the source device preparation request received from the host device 300, a full-garbage collection operation may be performed on the source storage device 100. The full-garbage collection operation may be an operation of collecting pieces of valid data stored in all memory blocks and storing the collected valid data in one or more free blocks. In detail, the full-garbage collection operation controller 115 may acquire a physical address indicating the location of the valid data stored in the memory device 120 with reference to a metadata area included in the buffer memory device 113. The full-garbage collection operation controller 115 may provide a read command and the physical address to the memory device 120 based on the acquired physical address. The memory device 120 may perform a read operation of reading valid data in response to the read command. The read valid data may be stored in a read cache area of the buffer memory device 113. Next, the full-garbage collection operation controller 115 may acquire a physical address indicating the location of a free block with reference to the metadata area. The full-garbage collection operation controller 115 may provide a write command, the physical address indicating the location of the free block, and valid data to the memory device 120. The memory device 120 may store the valid data in the free block in response to the write command. Thereafter, the full-garbage collection operation controller 115 may perform an operation of erasing memory blocks in which pieces of valid data were previously stored. The memory blocks on which the erase operation has been performed may become free blocks because data written thereto is not present.

While the full-garbage collection operation is being performed, the buffer memory device 113 may be used as an exclusive device for the full-garbage collection operation. In detail, referring to FIG. 5, all of the read cache area 2210, the write cache area 2220, and the background area 2230 included in the buffer memory device 113 may be used for the full-garbage collection operation. Therefore, since the capacity of the buffer memory device 113 that is usable for the full-garbage collection operation increases, the speed of the full-garbage collection operation may also increase.

When the full-garbage collection operation is completed, logical-to-physical (L2P) mapping information stored in the metadata area of the buffer memory device 113 may be updated to correspond to the changed data storage location. When the L2P mapping information is updated, the memory controller 110 may store the changed metadata in the memory device 120.

Next, the source storage device 100 may not perform one or more background operations so that the location of the data is not changed any more. The background operations may be operations that are performed so as to maintain the performance of the source storage device. The background operations may include map update, read reclaim, wear leveling, and garbage collection operations. Therefore, the background operation controller may be deactivated so that at least one of the background operations is not performed. The source storage device 100 may provide a source device preparation completion response to the host device 300.

Figure 10:
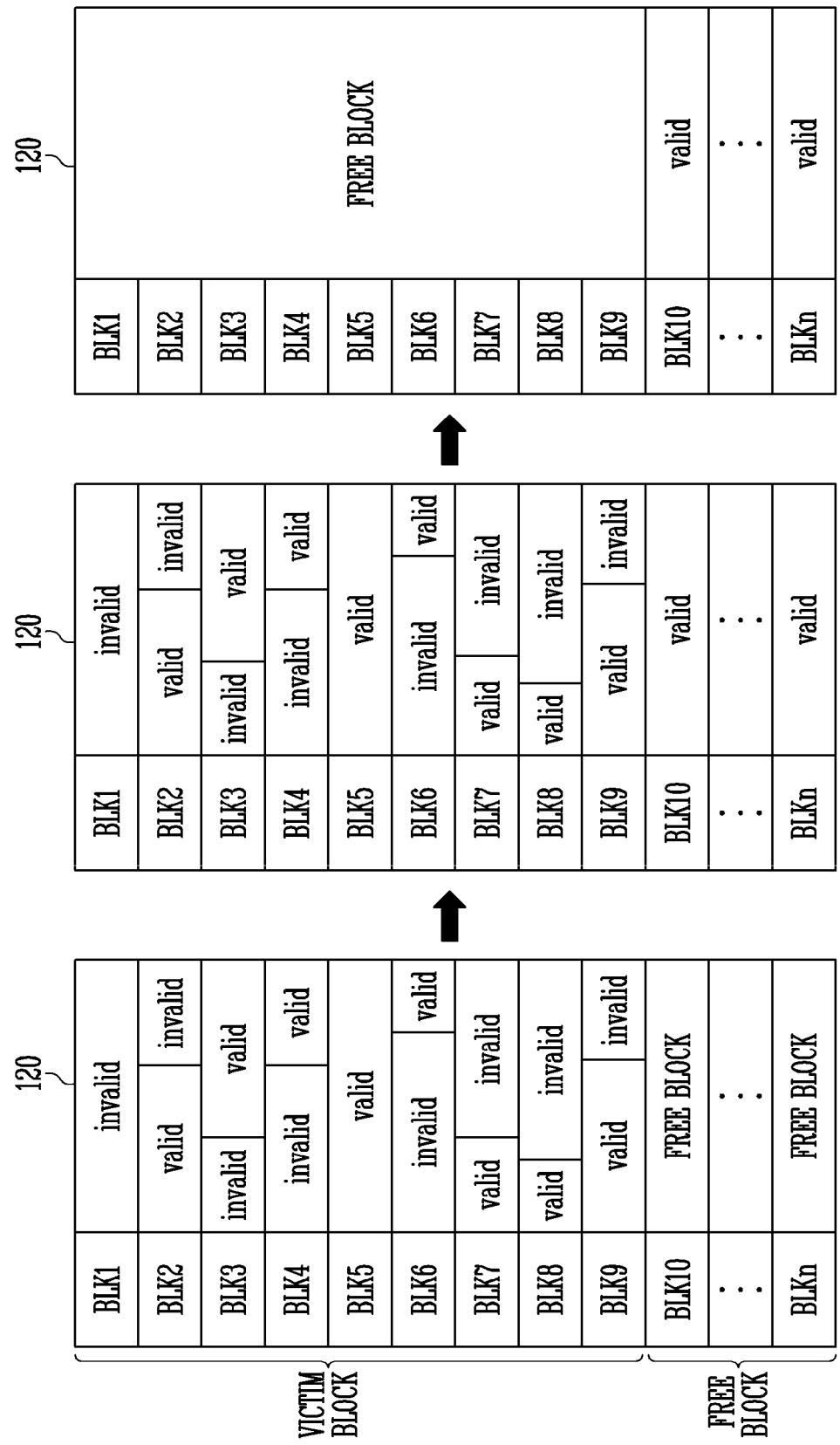
FIG. 10 is a diagram for illustrating in detail the full-garbage collection operation of FIG. 9 according to an embodiment of the present disclosure.

FIG. 10 is a diagram for illustrating in detail the full-garbage collection operation of FIG. 9 according to an embodiment of the present disclosure.

Referring to FIGS. 9 and 10, the memory device 120 of the source storage device 100 may include a plurality of memory blocks BLK1 to BLKn. Some of the memory blocks BLK1 to BLKn may each include valid data and invalid data. Referring to FIG. 10, the first block BLK1 may include invalid data. Each of the second block BLK2 to the fourth block BLK4 and the sixth block BLK6 to the ninth block BLK9 may include both valid data and invalid data. The fifth block BLK5 may include valid data. The tenth block BLK10 to the n-th block BLKn may be free blocks to which data is not written. The full-garbage collection operation controller 115 may select all writing-completed memory blocks BLK1 to BLK9 in which data is stored as victim blocks.

The full-garbage collection operation controller 115 may read all valid data stored in the victim blocks BLK1 to BLK9, and may store the read valid data in the tenth block BLK10 to the n-th block BLKn corresponding to the free blocks. The full-garbage collection operation controller 115 may perform an erase operation on the first block BLK1 to the ninth block BLK9. The memory blocks BLK1 to BLK9 on which the erase operation has been performed may become free blocks because data written thereto is not present. Since the memory blocks in which valid data is stored are changed, the L2P mapping information stored in the metadata area needs to be updated with physical addresses corresponding to the tenth block BLK10 to n-th block BLKn. Information about the valid data stored in the metadata area may be updated with the physical addresses corresponding to the tenth block BLK10 to the n-th block BLKn. When the full-garbage collection operation is completed, the memory controller 110 may store the changed metadata that has been stored in the metadata area in the memory device 120. The full-garbage collection operation controller 115 may provide a source device preparation completion response to the host device 300.

Figure 11:
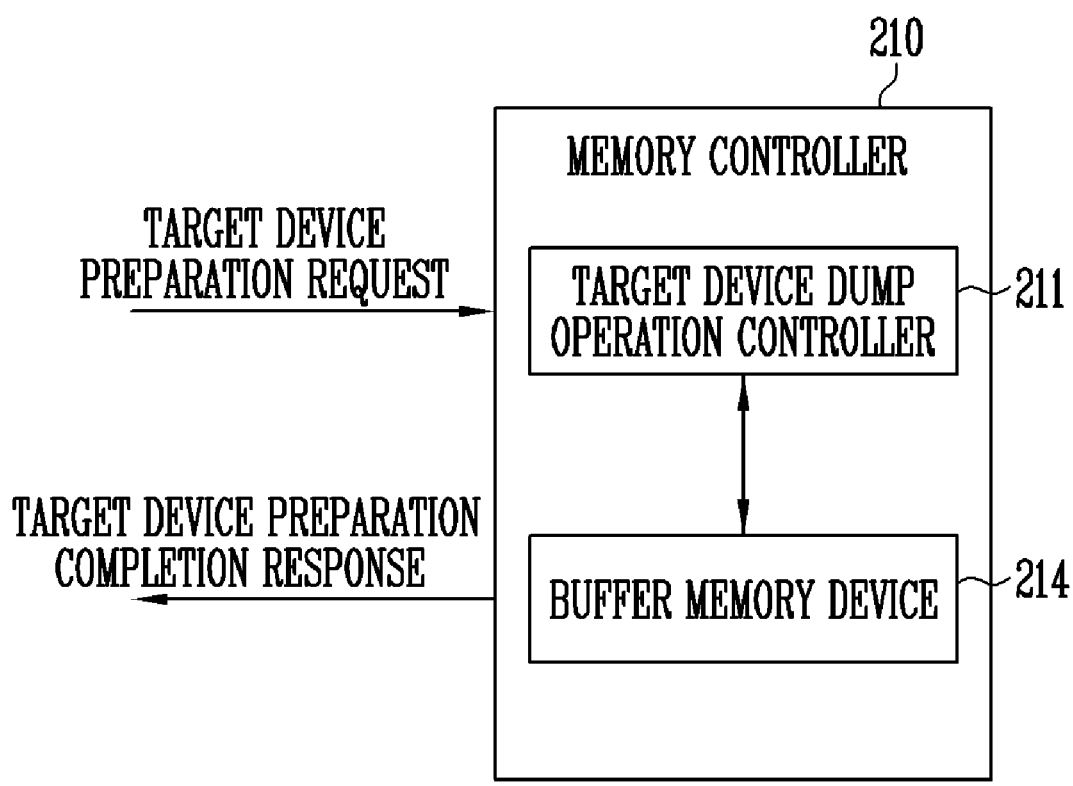
FIG. 11 is a diagram for illustrating a preparation operation of a target storage device is performed according to an embodiment of the present disclosure.

FIG. 11 is a diagram for illustrating a preparation operation of a target storage device including a memory controller 210 is performed according to an embodiment of the present disclosure.

Referring to FIGS. 6 and 11, the target storage device 200 needs to store dump data, received from the host device 300, in the memory device 220. In detail, the host device 300 may provide a target device preparation request to the target storage device 200 through a host interface. The target device dump operation controller 211 may set the buffer memory device 214 to an exclusive device for a write operation in response to the target device preparation request. In an embodiment, all of the read cache area, the write cache area, and the background area included in the buffer memory device 214 may be set to the write cache area.

Also, a background operation controller included in the memory controller 210 may deactivate at least one of background operations. Unless the background operations are performed, the efficiency of a target device dump execution operation, which will be described later, may increase. The target storage device 200 may provide a target device preparation completion response to the host device 300 through the host interface.

Figure 12:
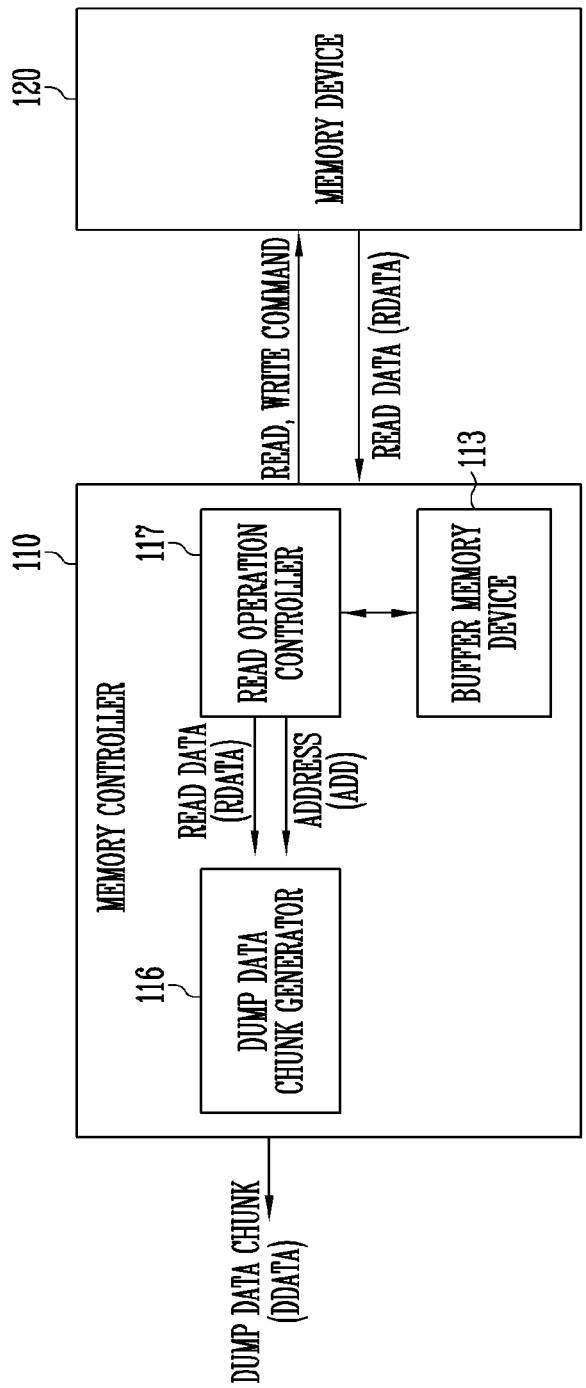
FIG. 12 is a diagram for illustrating an operation of generating a dump data chunk according to an embodiment of the present disclosure.

FIG. 12 is a diagram for illustrating an operation of generating a dump data chunk DDATA according to an embodiment of the present disclosure.

Referring to FIG. 12, a memory controller 110 may include a dump data chunk generator 116, a read operation controller 117, and a buffer memory device 113.

Referring to FIGS. 6 and 12, a host device 300 may provide a source device dump execution request to a source storage device 100 including the memory controller 110 through a host interface. The dump data chunk generator 116 may generate dump data chunks DDATA using the memory device 120 in response to the request received from the host device 300. Each of the dump data chunks DDATA may contain data read from the memory device 120 and a physical address at which the read data is stored. The memory controller 110 of the source storage device 100 may provide the generated dump data chunks DDATA to the host device 300. The host device 300 may provide the dump data chunks DDATA to a target storage device 200. Since the target storage device 200 receives both the data and the physical address from the host device 300, there is no need to perform a logical-to-physical address translation operation through a flash translation layer (FTL). Therefore, since the memory controller 210 of the target storage device 200 may directly provide the received physical address to the memory device 220 included in the target storage device 200, data movement efficiency between from the source storage device 100 to the target storage device 200 may be improved.

In detail, the operation of generating the dump data chunks DDATA will be described below. Referring to FIGS. 6 and 12, the memory controller 110 may receive a source device dump execution request from the host device 300 through the host interface. The memory controller 110 may perform a read operation of reading valid data stored in the memory device 120 in response to the received source device dump execution request. Here, the memory device 120 may be in a state in which the bad block processing operation and the full-garbage collection operation, described above with reference to FIGS. 7 to 10, have already been performed. Therefore, the stored valid data may be rearranged in the memory device 120 of the source storage device 100, as illustrated in FIG. 8 or 10. Next, the memory controller 110 may acquire read data RDATA by reading the valid data stored in the memory device 120. Next, the memory controller 110 may generate dump data chunks DDATA, each including read data RDATA and physical addresses indicating locations at which the read data RDATA is stored. In detail, the read operation controller 117 may acquire information about valid data stored in the metadata area. The acquired valid data information may be physical addresses indicating the locations of the memory blocks in which the valid data is stored. The read operation controller 117 may provide a read command and the acquired physical addresses to the memory device 120. The read operation controller 117 may perform a read operation of reading the valid data stored in the memory device 120. The memory device 120 may provide the read data RDATA to the memory controller 110. The read operation controller 117 may provide the read data RDATA to the dump data chunk generator 116. The read operation controller 117 may acquire physical addresses indicating the locations at which the read data RDATA is stored, with reference to the buffer memory device 113. The read operation controller 117 may provide the acquired physical addresses to the dump data chunk generator 116. The dump data chunk generator 116 may generate dump data chunks DDATA using the received read data RDATA and the physical addresses. The generated dump data chunks DDATA may be provided to the host device 300 through the host interface. The source storage device 100 may provide a source device dump completion response to the host device 300 through the host interface.

As described above with reference to FIG. 9, at least one of background operations, performed on the source storage device 100 while the dump data chunks DDATA are being generated, may be in a deactivated state. Also, the buffer memory device 113 may be used as an exclusive device for a read operation while the dump data chunks DDATA are being generated. In an embodiment, all of the read cache area, the write cache area, and the background area included in the buffer memory device 113 may be set to the read cache area. Therefore, since the data stored in the memory device 120 may be read at high speed, the operation of generating dump data chunks DDATA may be performed fast.

Figure 13:
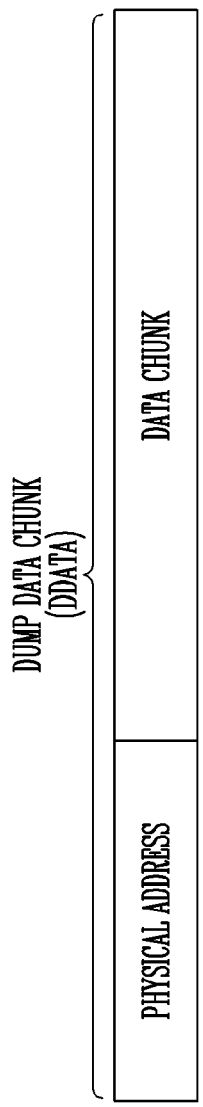
FIG. 13 is a diagram for illustrating the dump data chunk of FIG. 12 according to an embodiment of the present disclosure.

FIG. 13 is a diagram for illustrating the dump data chunk DDATA of FIG. 12 according to an embodiment of the present disclosure.

In an embodiment, the dump data chunk generator 116 in FIG. 12 may generate dump data chunks DDATA in response to a source device dump execution request received from the host device 300 in FIG. 6. Such a dump data chunk DDATA may include a data chunk that is valid data to be stored in the target storage device 200 and a physical address indicating the locations of memory cells in which the data chunk is to be stored.

In an embodiment, the source storage device 100 may provide the generated dump data chunks DDATA to the host device 300. The host device 300 may provide the dump data chunks DDATA to the target storage device 200. The target storage device 200 may decode the received dump data chunks DDATA and then acquire the physical addresses and the data chunks. The target storage device 200 may store the data chunks acquired through the decoding operation at storage locations indicated by the acquired physical addresses. Therefore, mapping relationships between the logical addresses and physical addresses of the data stored in the target storage device 200 and the source storage device 100 may be equally maintained.

The dump data chunks DDATA according to the embodiment shown in FIG. 13 are merely an example, and may vary in accordance with various embodiments.

Figure 14:
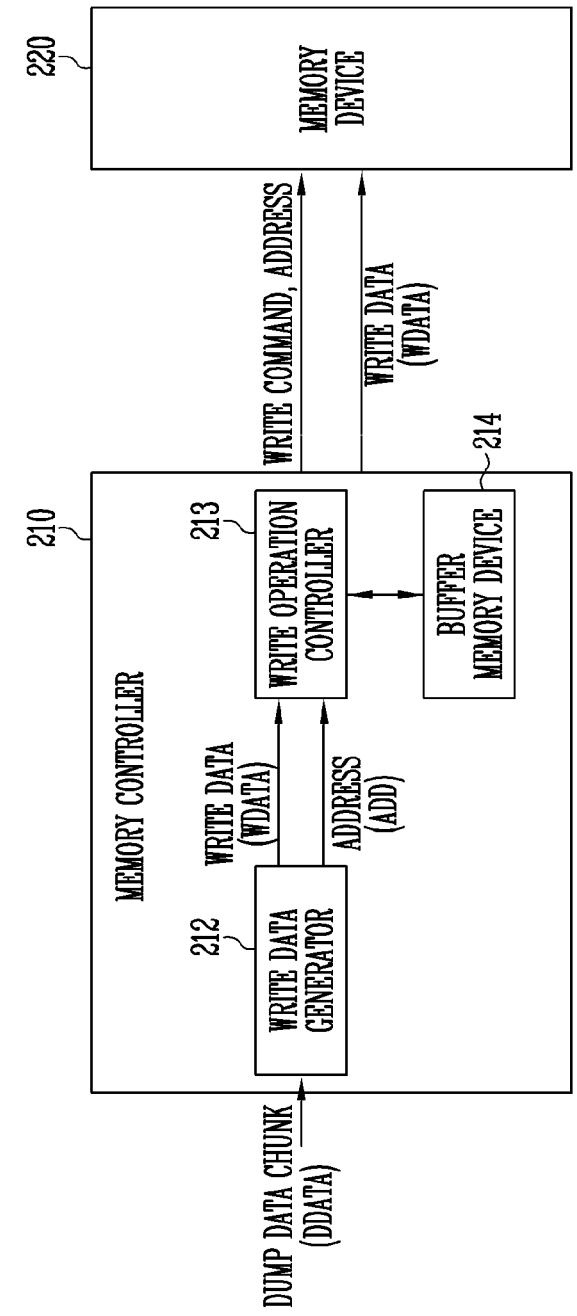
FIG. 14 is a diagram illustrating an operating method in which dump data chunks are stored in a memory device of a target storage device according to an embodiment of the present disclosure.

FIG. 14 is a diagram illustrating an operating method in which dump data chunks DDATA are stored in a memory device 220 of a target storage device 200 according to an embodiment of the present disclosure.

Referring to FIG. 14, the target storage device 200 may include a memory controller 210 and the memory device 220. The memory controller 210 may include a write data generator 212, a write operation controller 213, and a buffer memory device 214.

The host device 300 may provide a target device dump execution request and dump data chunks DDATA to the target storage device 200 through a host interface. The target storage device 200 may store data depending on physical addresses contained in the received dump data chunks DDATA.

In detail, the write data generator 212 may receive the dump data chunks DDATA. The write data generator 212 may decode the dump data chunks DDATA and then generate write data WDATA to be stored in the memory device 220 and physical addresses ADD indicating the locations of memory cells in which the write data WDATA is to be stored. The write data generator 212 may provide the generated write data WDATA and the physical addresses ADD to the write operation controller 213. Since the write operation controller 213 have already acquired the physical addresses ADD indicating the locations at which the write data WDATA is to be stored, the memory controller 210 may not perform a logical-to-physical address translation operation through an FTL. The memory controller 210 may provide a write command, the physical addresses ADD, and the write data WDATA to the memory device 220.

While the write data WDATA is being stored in the memory device 220 in response to the write command, the buffer memory device 214 may be used as an exclusive device for the write operation, as described above with reference to FIG. 11. Therefore, since the write data WDATA may be stored in the memory device 220 at a high speed, the entire write operation speed may be improved.

When the write data WDATA is stored in the memory device 220, the target storage device 200 may provide a target device dump completion response to the host device 300 through the host interface.

Figure 15:
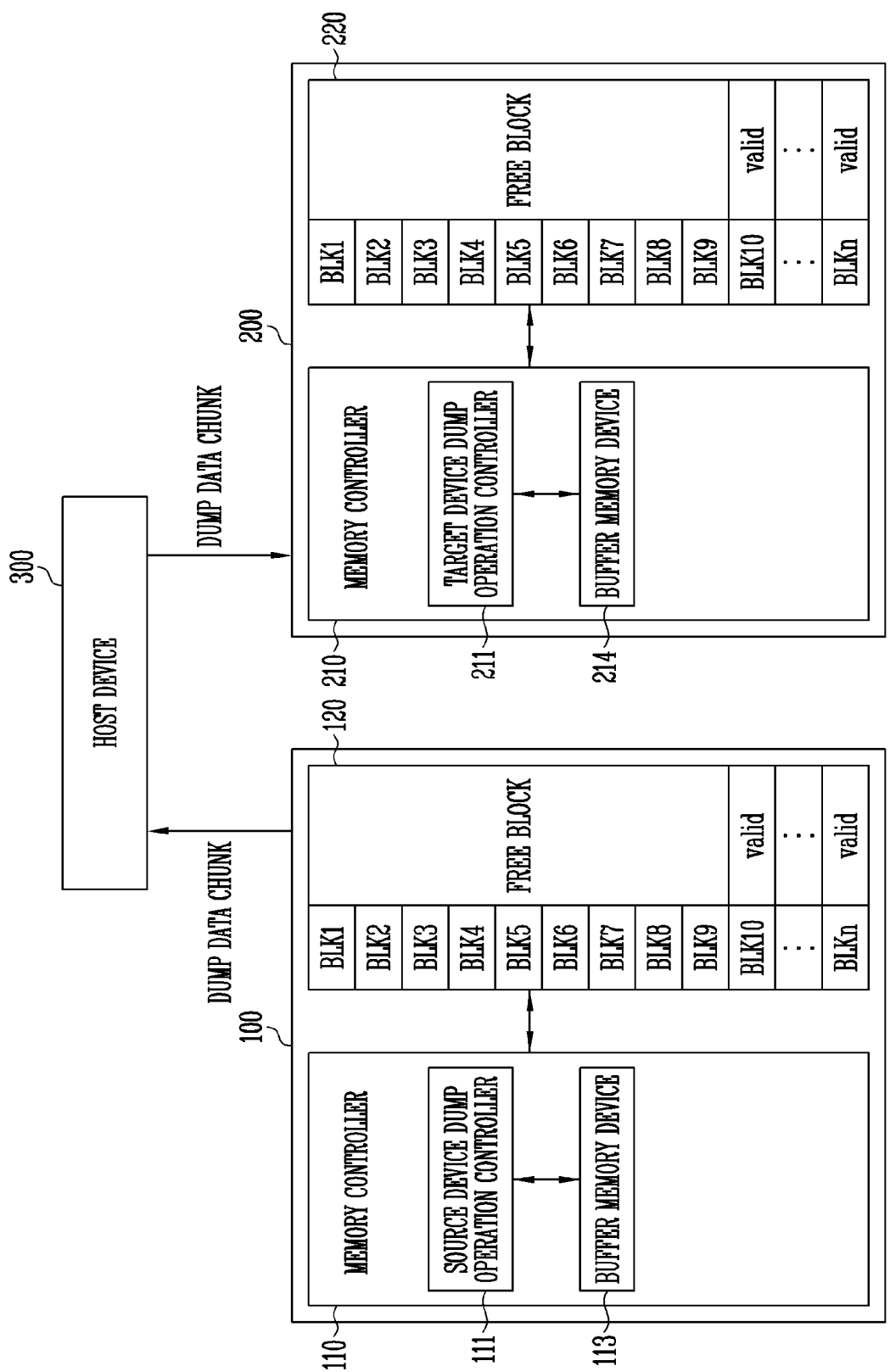
FIG. 15 is a diagram for illustrating data stored in a target storage device and a source storage device after a dump operation has been performed according to an embodiment of the present disclosure.

FIG. 15 is a diagram for illustrating data stored in a target storage device 200 and a source storage device 100 after a dump operation has been performed according to an embodiment of the present disclosure.

The source storage device 100 illustrated in FIG. 15 may indicate a state after the bad block processing operation and the full-garbage collection operation described above with reference to FIGS. 7 to 10 according to an embodiment of the present disclosure have been completed. Therefore, as illustrated in FIG. 15, valid data may be stored in memory blocks BLK10 to BLKn of the memory device 120. Also, the buffer memory device 113 may store information indicating valid data stored in the memory device 120 and the logical-to-physical address mapping information of the stored valid data. The information indicating the valid data and the logical-to-physical address mapping information of the stored valid data may be stored in the memory device 120 of the source storage device 100.

In an embodiment, in response to a source device dump execution request received from the host device 300, the source storage device 100 may provide dump data chunks DDATA, each including valid data and one or more physical addresses, to the host device 300. The host device 300 may provide the dump data chunks DDATA to the target storage device 200. As illustrated in FIG. 14, the target storage device 200 may generate write data WDATA. Further, the memory controller 210 may store the data, included in the dump data chunks DDATA, in a memory block having the corresponding physical address using the data and physical addresses included in the dump data chunks DDATA.

Consequently, data stored in the tenth block BLK10 of the source storage device 100 and data stored in the tenth block BLK10 of the target storage device 200 may be identical to each other. Similarly, even in other memory blocks, pieces of data stored in a pair of memory blocks in the source storage device 100 and the target storage device 200 having the same block address may be identical to each other. Since a bad block processing operation has been performed on the source storage device 100, valid data is not stored in a source bad block of the source storage device 100 having the same block address as a bad block of the target storage device 200, thereby preventing the valid data from being stored in the bad block of the target storage device 200. In addition, when a full-garbage collection operation, a write operation, and a read operation according to an embodiment of the present disclosure are performed, usage of a buffer memory device in a memory controller used to perform any one of these operations may be increased, thereby increasing an operation speed thereof. For example, when such a buffer memory device includes a read cache area, a write cache area, a background area, and a metadata area, the read cache area, the write cache area, the background area may be used together to perform any one of the operations. Also, since each dump data chunk DDATA provided by the host device 300 includes data and a physical address at which the data is to be stored, the target storage device 200 does not need to translate a logical address into a physical address, thereby increasing data transfer efficiency from the source storage device 100 to the target storage device 200.

Figure 16:
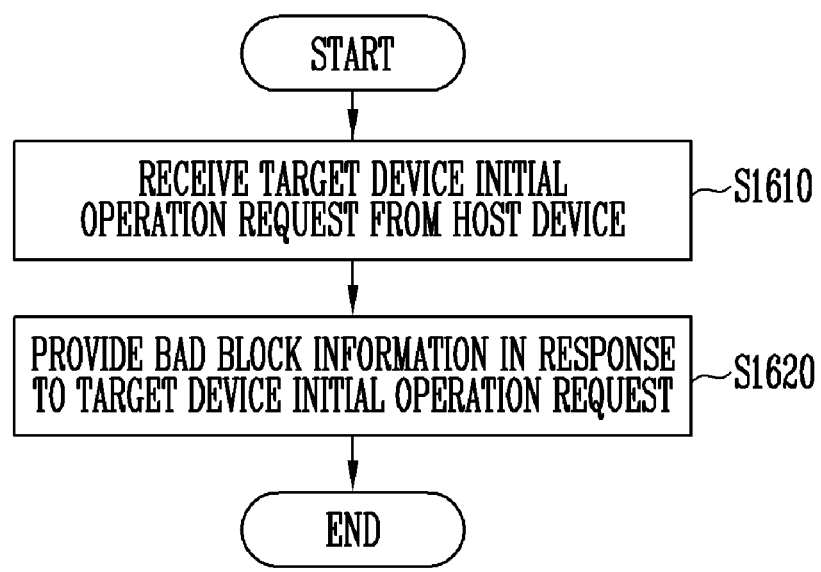
FIG. 16 is a flowchart illustrating in detail a method in which an initial operation is performed on a target storage device that is a new storage device according to an embodiment of the present disclosure.

FIG. 16 is a flowchart illustrating in detail a method in which an initial operation (or a target device initial operation) is performed on a target storage device (e.g. the target storage device 200 in FIG. 6) that is a new storage device according to an embodiment of the present disclosure.

At step S1610, the target storage device 200 may receive a target device initial operation request from a host device (e.g., the host device 300 in FIG. 6).

At step S1620, the target storage device 200 may provide bad block information to the host device 300 in response to the request received from the host device 300. The bad block information may be physical addresses of memory blocks in which data cannot be normally stored, among memory blocks included in the target storage device 200.

Figure 17:
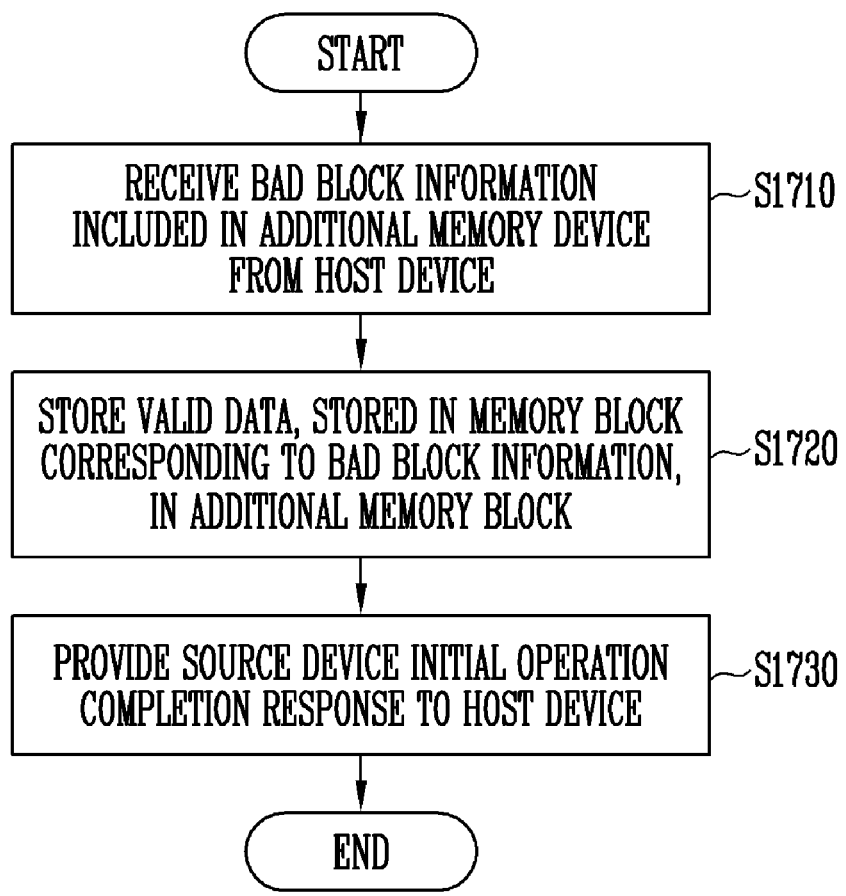
FIG. 17 is a flowchart illustrating in detail a method in which an initial operation is performed on a source storage device that is an existing storage device according to an embodiment of the present disclosure.

FIG. 17 is a flowchart illustrating in detail a method in which an initial operation (or a source device initial operation) is performed on a source storage device (e.g., the source storage device 100 in FIG. 6) that is an existing storage device.

At step S1710, the source storage device 100 may receive bad block information for identifying bad blocks of an additional (new) storage device (e.g., the target storage device 200), together with a source device initial operation request, from the host device 300.

At step S1720, the source storage device 100 may move valid data stored in a memory block corresponding to the received bad block information to a different memory block (or an available memory block) in the source storage device 100. In an embodiment, the bad block information for identifying bad blocks of the new storage device may include a physical address indicating the location of each bad block. Here, the source storage device 100 may control a memory device (e.g., the memory device 120 in FIG. 6) so that valid data is not stored in bad blocks included in the source storage device 100.

At step S1730, the source storage device 100 may provide a source device initial operation completion response to the host device 300 after the movement of the valid data has been completed.

Figure 18:
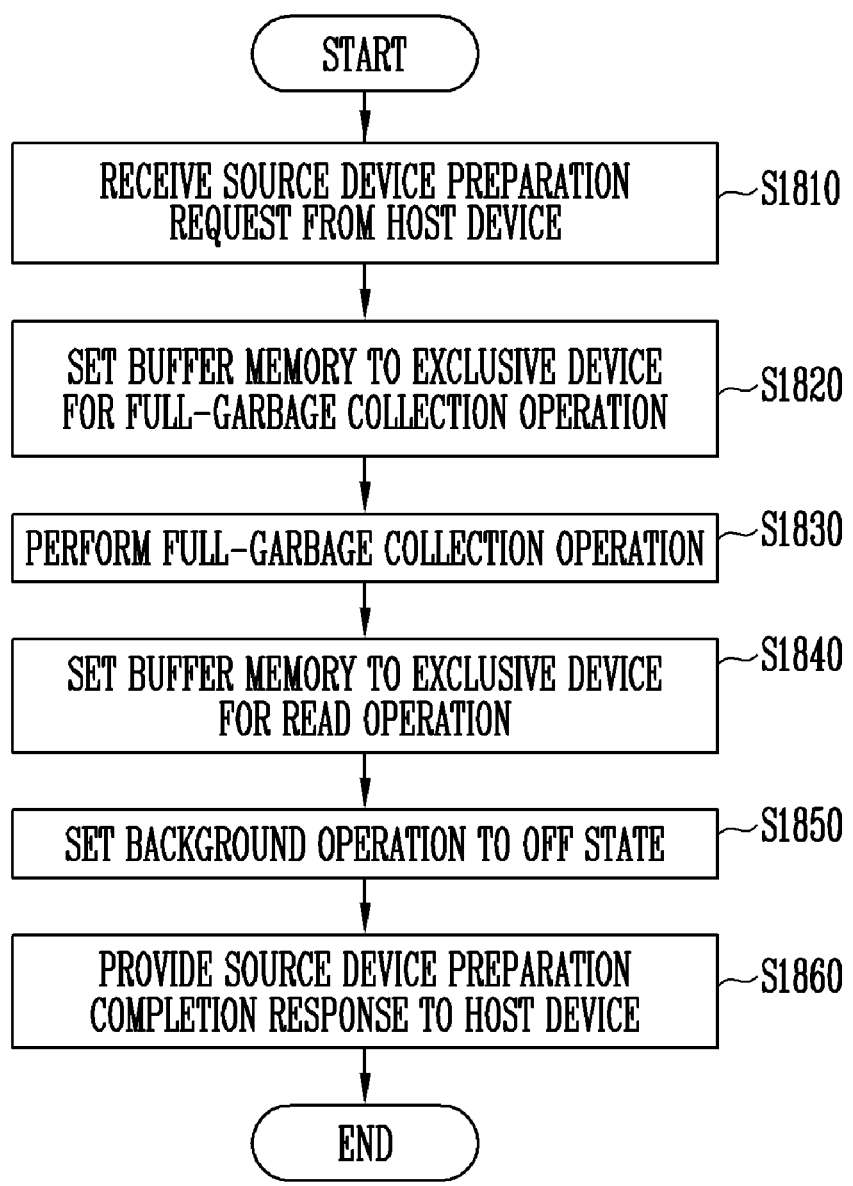
FIG. 18 is a flowchart illustrating in detail a process in which a source device preparation operation including a full-garbage collection operation is performed on a source storage device according to an embodiment of the present disclosure.

FIG. 18 is a flowchart illustrating in detail a process in which a source device preparation operation including a full-garbage collection operation is performed on a source storage device (e.g., the source storage device 100 in FIG. 6), according to an embodiment of the present disclosure.

At step S1810, a host device (e.g., the host device 300 in FIG. 6) may provide a source device preparation request to the source storage device 100.

At step S1820, a memory controller (e.g., the memory controller 110 in FIG. 6) may set a buffer memory device included in the source storage device 100 to an exclusive device for a full-garbage collection operation. This is an operation for improving operation efficiency so that the full-garbage collection operation may be completed within a short period of time.

At step S1830, the full-garbage collection operation, described above with reference to FIGS. 9 and 10, may be performed on the source storage device 100.

At step S1840, the memory controller 110 may set a buffer memory device included in the source storage device 100 to an exclusive device for a read operation.

At step S1850, one or more of background operations including a map update operation, a read reclaim operation, and a wear-leveling operation may be set to an off state. By performing the above-described operations at steps S1840 and S1850, the efficiency of the source device dump execution operation, which is to be subsequently performed, may be improved.

At step S1860, the memory controller 110 may provide a source device preparation completion response to the host device 300.

Figure 19:
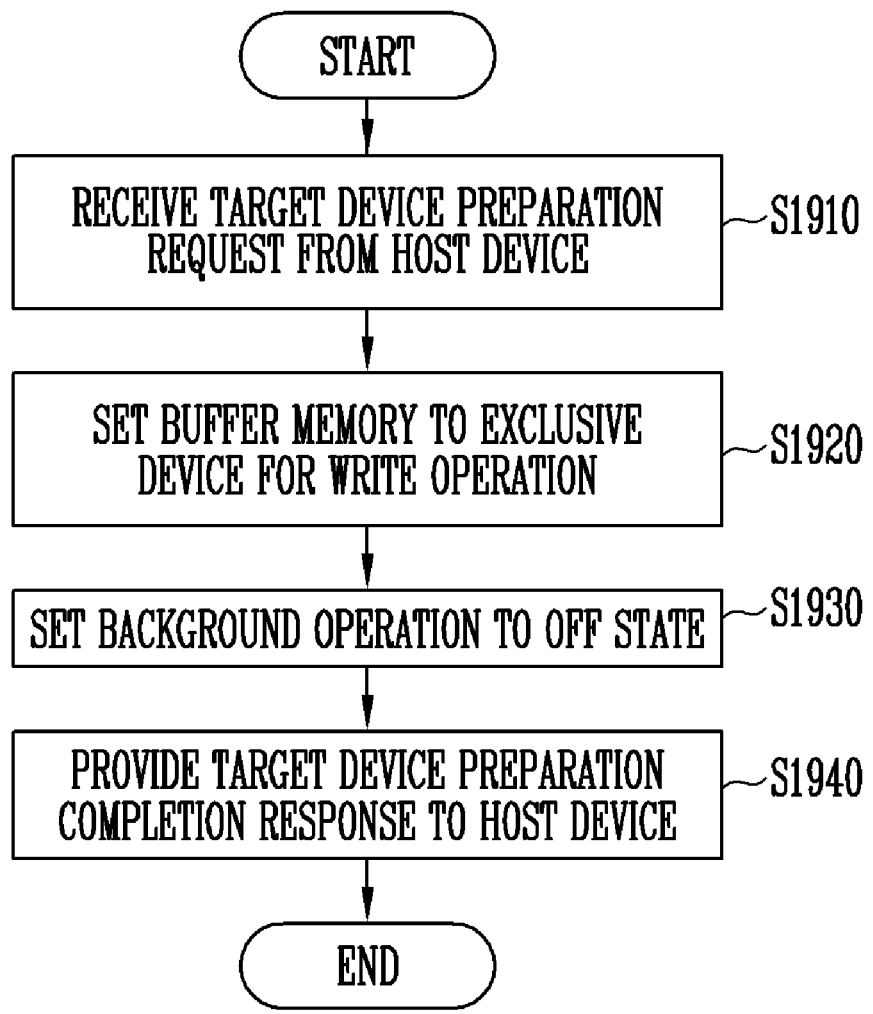
FIG. 19 is a flowchart illustrating in detail a process in which a preparation operation is performed on a target storage device according to an embodiment of the present disclosure.

FIG. 19 is a flowchart illustrating in detail a process in which a preparation operation (or a target device preparation operation) is performed on a target storage device (e.g., the target storage device 200 in FIG. 6), according to an embodiment of the present disclosure.

At step S1910, the target storage device 200 may receive a target device preparation request from a host device (e.g., the host device 300 in FIG. 6).

At step S1920, a memory controller (e.g., the memory controller 210 in FIG. 6) may set a buffer memory device included in the target storage device 200 to an exclusive device for a write operation.

At step S1930, one or more of background operations including a map update operation, a read reclaim operation, and a wear-leveling operation may be set to an off state. By performing the above-described operations at steps S1920 and S1930, an operation of storing dump data, which is to be subsequently performed, may be efficiently performed.

At step S1940, the memory controller 210 may provide a target device preparation completion response to the host device 300.

Figure 20:
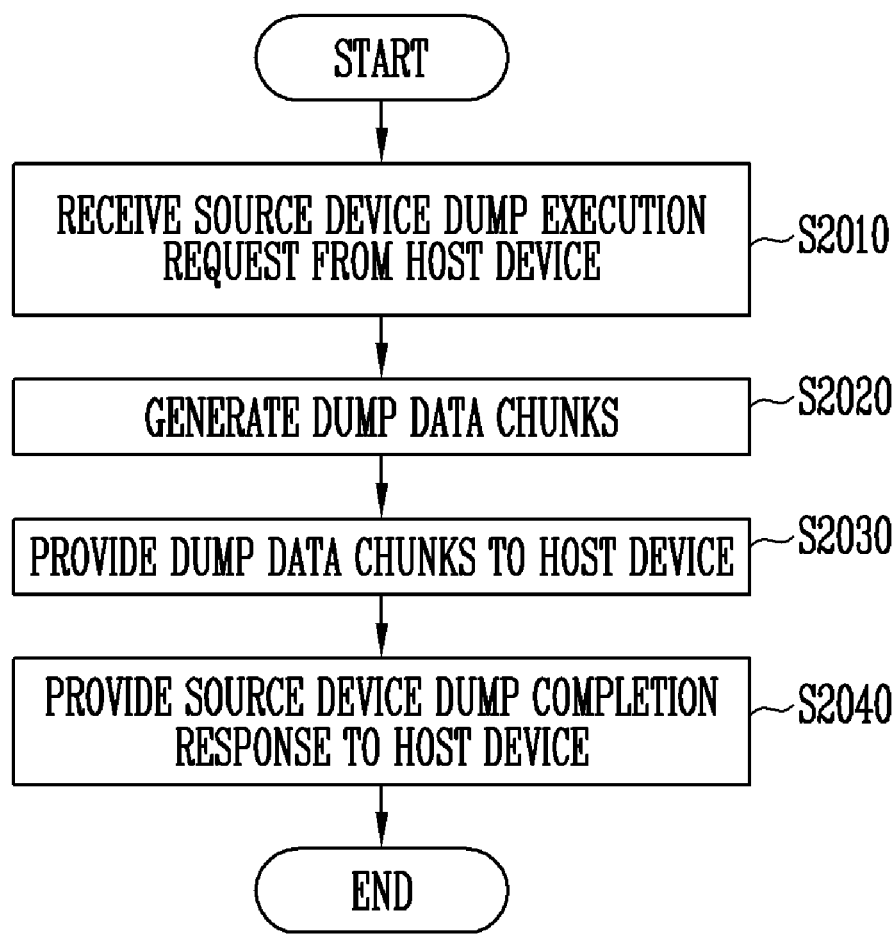
FIG. 20 is a flowchart illustrating an operation in which a source storage device that is a replacement target generates a dump data chunk according to an embodiment of the present disclosure.

FIG. 20 is a flowchart illustrating an operation (or a source device dump execution operation) in which a source storage device (e.g., the source storage device 100 in FIG. 6) that is a replacement target generates a dump data chunk according to an embodiment of the present disclosure.

At step S2010, the source storage device 100 may receive a source device dump execution request from a host device (e.g., the host device 300 in FIG. 6).

At step S2020, a dump data chunk generator (e.g., the dump data chunk generator 116 in FIG. 12) may generate dump data chunks DDATA to be provided to a target storage device (e.g., the target storage device 200 in FIG. 6). In detail, referring to FIG. 12, the memory controller 110 may provide a read command to the memory device 120. The read operation controller 117 may acquire a physical address at which valid data is stored with reference to the buffer memory device 113. The memory device 120 may read data stored in a memory block corresponding to the physical address in response to the read command. The dump data chunk generator 116 may generate dump data chunks DDATA, each including read data RDATA and one or more physical addresses. At step S1840 in FIG. 18, the buffer memory device 113 has been set to an exclusive device for a read operation, and thus the efficiency of the read operation may be improved. Therefore, the dump data chunks DDATA may be generated at a high speed.

At step S2030, the source storage device 100 may provide the dump data chunks DDATA to the host device 300.

At step S2040, after all of the dump data chunks DDATA have been provided to the host device 300, the source storage device 100 may provide a source device dump completion response to the host device 300.

Figure 21:
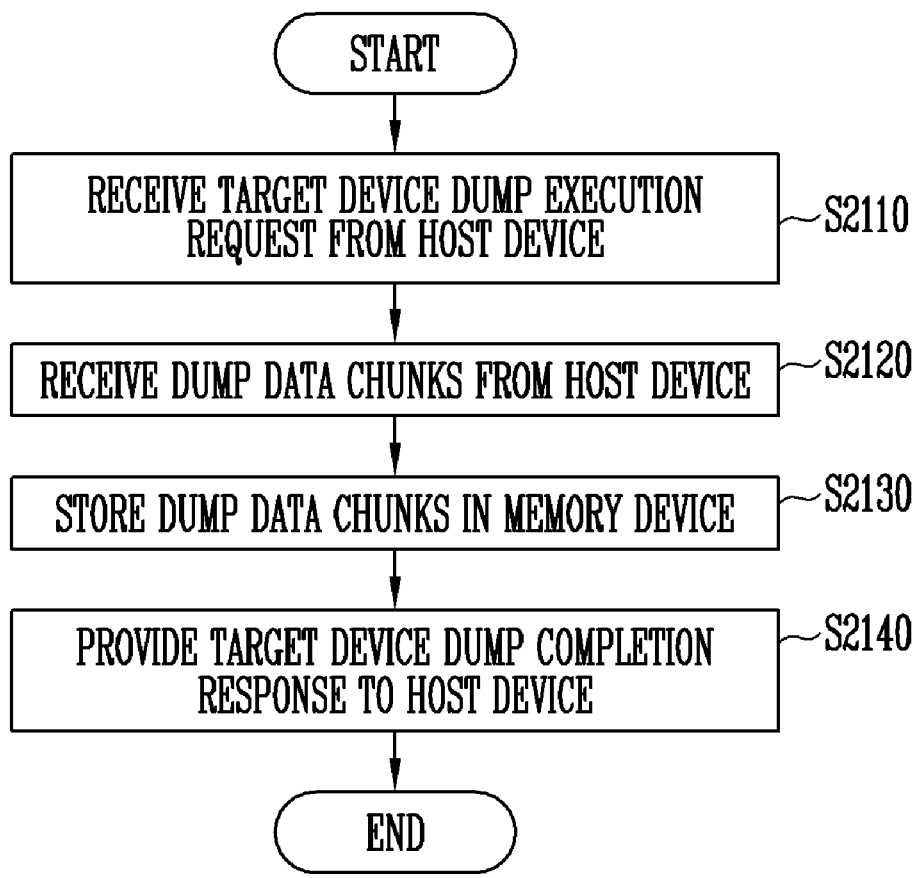
FIG. 21 is a flowchart illustrating an operation of storing a dump data chunk in a new storage device according to an embodiment of the present disclosure.

FIG. 21 is a flowchart illustrating an operation (or a target device dump execution operation) of storing a dump data chunk in a new storage device (e.g., the target storage device 200 in FIG. 6) according to an embodiment of the present disclosure.

At step S2110, the target storage device 200 may receive a target device dump execution request from a host device (e.g., the host device 300 in FIG. 6).

At step S2120, the target storage device 200 may receive dump data chunks from the host device 300. The dump data chunks may include physical addresses indicating locations at which the valid data is stored in a source storage device (e.g., the source storage device 100 in FIG. 6).

At step S2130, the dump data chunks may be stored in a memory device (e.g., the memory device 220 in FIG. 14) of the target storage device 200. Here, since the dump data chunks received from the host device 300 include physical addresses indicating the locations at which data is to be stored, a logical-to-physical address translation operation is not needed. Further, at step S1920 in FIG. 19, since the buffer memory device has been set to exclusive device for a write operation, the efficiency of the write operation may be improved.

At step S2140, after all of the dump data has been stored in the memory device 220, the target storage device 200 may provide a target device dump completion response to the host device 300.

Figure 22:
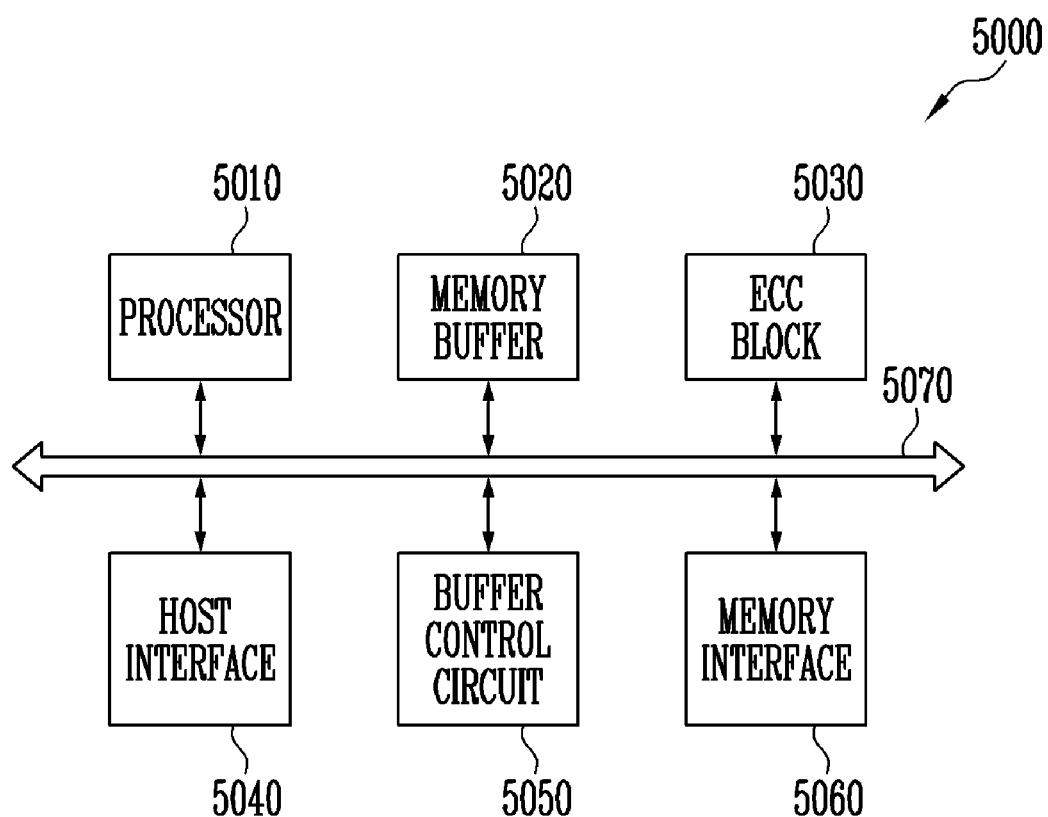
FIG. 22 is a diagram illustrating a memory controller suitable for use as the memory controller of FIG. 2 according to an embodiment of the present disclosure.

FIG. 22 is a diagram illustrating a memory controller 5000 suitable for use as the memory controller 2000 of FIG. 2 according to an embodiment of the present disclosure.

The memory controller 5000 is coupled to a host device and a memory device. In response to a request received from the host device, the memory controller 5000 may access the memory device.

Referring to FIG. 22, the memory controller 5000 may include a processor 5010, a memory buffer 5020, an error correction code (ECC) block 5030, a host interface 5040, a buffer control circuit 5050, a memory interface 5060, and a bus 5070.

The bus 5070 may provide a channel between components of the memory controller 5000.

The processor 5010 may control the overall operation of the memory controller 5000 and perform a logical operation. The processor 5010 may communicate with an external host device through the host interface 5040 and also communicate with the memory device through the memory interface 5060. Further, the processor 5010 may communicate with the memory buffer 5020 through the buffer control circuit 5050. The processor 5010 may control the operation of the storage device by using the memory buffer 5020 as a working memory, a cache memory, or a buffer memory.

The processor 5010 may perform a function of a flash translation layer (FTL). The processor 5010 may randomize data received from the host device. For example, the processor 5010 may use a random seed to randomize the data received from the host device. The randomized data may be provided, as data to be stored, to the memory device, and may be programmed to a memory cell array.

The processor 5010 may derandomize the data received from the memory device during a read operation. For example, the processor 5010 may derandomize the data received from the memory device using a derandom seed. The derandomized data may be output to the host device.

In an embodiment, the processor 5010 may run software or firmware to perform the randomizing or derandomizing operation.

The memory buffer 5020 may be used as a working memory, a cache memory, or a buffer memory of the processor 5010. The memory buffer 5020 may store codes and commands that are executed by the processor 5010. The memory buffer 5020 may store data that is processed by the processor 5010. The memory buffer 5020 may include a static RAM (SRAM) or a dynamic RAM (DRAM).

The ECC block 5030 may perform error correction. The ECC block 5030 may perform ECC encoding based on data to be written to the memory device through the memory interface 5060. The ECC-encoded data may be transferred to the memory device through the memory interface 5060. The ECC block 5030 may perform ECC decoding based on data received from the memory device through the memory interface 5060. In an example, the ECC block 5030 may be included, as the component of the memory interface 5060, in the memory interface 5060.

The host interface 5040 may communicate with the external host device under the control of the processor 5010. The host interface 5040 may perform communication using one or more of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Non-Volatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 5050 may control the memory buffer 5020 under the control of the processor 5010.

The memory interface 5060 may communicate with the memory device under the control of the processor 5010. The memory interface 5060 may transmit/receive commands, addresses, and data to/from the memory device through channels.

In an embodiment, the memory controller 5000 may not include the memory buffer 5020 and the buffer control circuit 5050.

In an embodiment, the processor 5010 may control the operation of the memory controller 5000 using codes. The processor 5010 may load codes from a nonvolatile memory device (e.g., ROM) provided in the memory controller 5000. In an embodiment, the processor 5010 may load codes from the memory device through the memory interface 5060.

In an embodiment, the bus 5070 of the memory controller 5000 may be divided into a control bus and a data bus. The data bus may transmit data in the memory controller 5000, and the control bus may transmit control information, such as commands or addresses, in the memory controller 5000. The data bus and the control bus may be separated from each other, and may neither interfere with each other nor influence each other. The data bus may be coupled to the host interface 5040, the buffer control circuit 5050, the ECC block 5030, and the memory interface 5060. The control bus may be coupled to the host interface 5040, the processor 5010, the buffer control circuit 5050, the memory buffer 5020, and the memory interface 5060.

Figure 23:
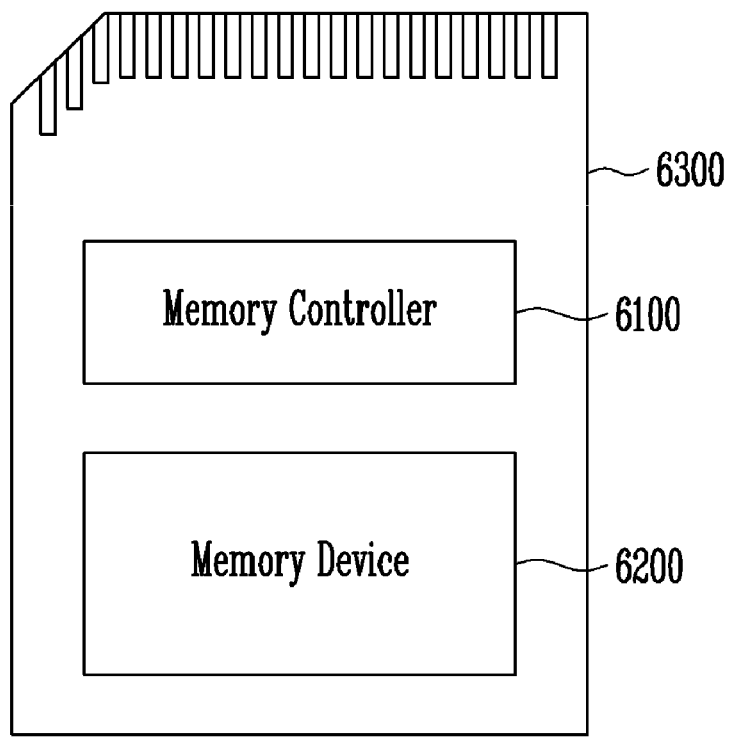
FIG. 23 is a block diagram illustrating a memory card system to which a storage device including a memory device according to an embodiment of the present disclosure is applied.

FIG. 23 is a block diagram illustrating a memory card system 6000 to which a storage device including a memory device according to an embodiment of the present disclosure is applied.

Referring to FIG. 23, the memory card system 6000 may include a memory controller 6100, a memory device 6200, and a connector 6300.

The memory controller 6100 is coupled to the memory device 6200. The memory controller 6100 may access the memory device 6200. The memory controller 6100 may be implemented in the same way as the memory controller 2000, described above with reference to FIG. 2.

In an embodiment, the memory controller 6100 may include components, such as a RAM, a processor, a host interface, a memory interface, and an ECC block.

The memory controller 6100 may communicate with an external device through the connector 6300. The memory controller 6100 may communicate with an external device (e.g., a host device) based on a specific communication protocol. In an embodiment, the memory controller 6100 may communicate with the external device using one or more of various communication protocols, such as universal serial bus (USB), multimedia card (MMC), embedded MMC (eMMC), peripheral component interconnection (PCI), PCI-express (PCI-E), an advanced technology attachment (ATA), serial-ATA (SATA), parallel-ATA (PATA), small computer system interface (SCSI), enhanced small disk interface (ESDI), integrated drive electronics (IDE), firewire, universal flash storage (UFS), WiFi, Bluetooth, and nonvolatile memory express (NVMe) protocols. In an embodiment, the connector 6300 may be defined by at least one of the above-described various communication protocols.

In an embodiment, the memory device 6200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), and a Spin-Torque Magnetic RAM (STT-MRAM).

In an embodiment, the memory controller 6100 or the memory device 6200 may be packaged in a type such as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), or the like, and may be provided as a single semiconductor package. Alternatively, the memory device 6200 may include a plurality of nonvolatile memory chips, which may be packaged based on the above-described package types and may then be provided as a single semiconductor package.

In an embodiment, the memory controller 6100 and the memory device 6200 may be integrated into a single semiconductor device. In an embodiment, the memory controller 6100 and the memory device 6200 may be integrated into a single semiconductor device to form a solid state drive (SSD). The memory controller 6100 and the memory device 6200 may be integrated into a single semiconductor device to form a memory card. For example, the memory controller 6100 and the memory device 6200 may be integrated into a single semiconductor device to form a memory card such as a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

In an embodiment, the memory device 6200 may be the memory device 1000, described above with reference to FIG. 2.

Figure 24:
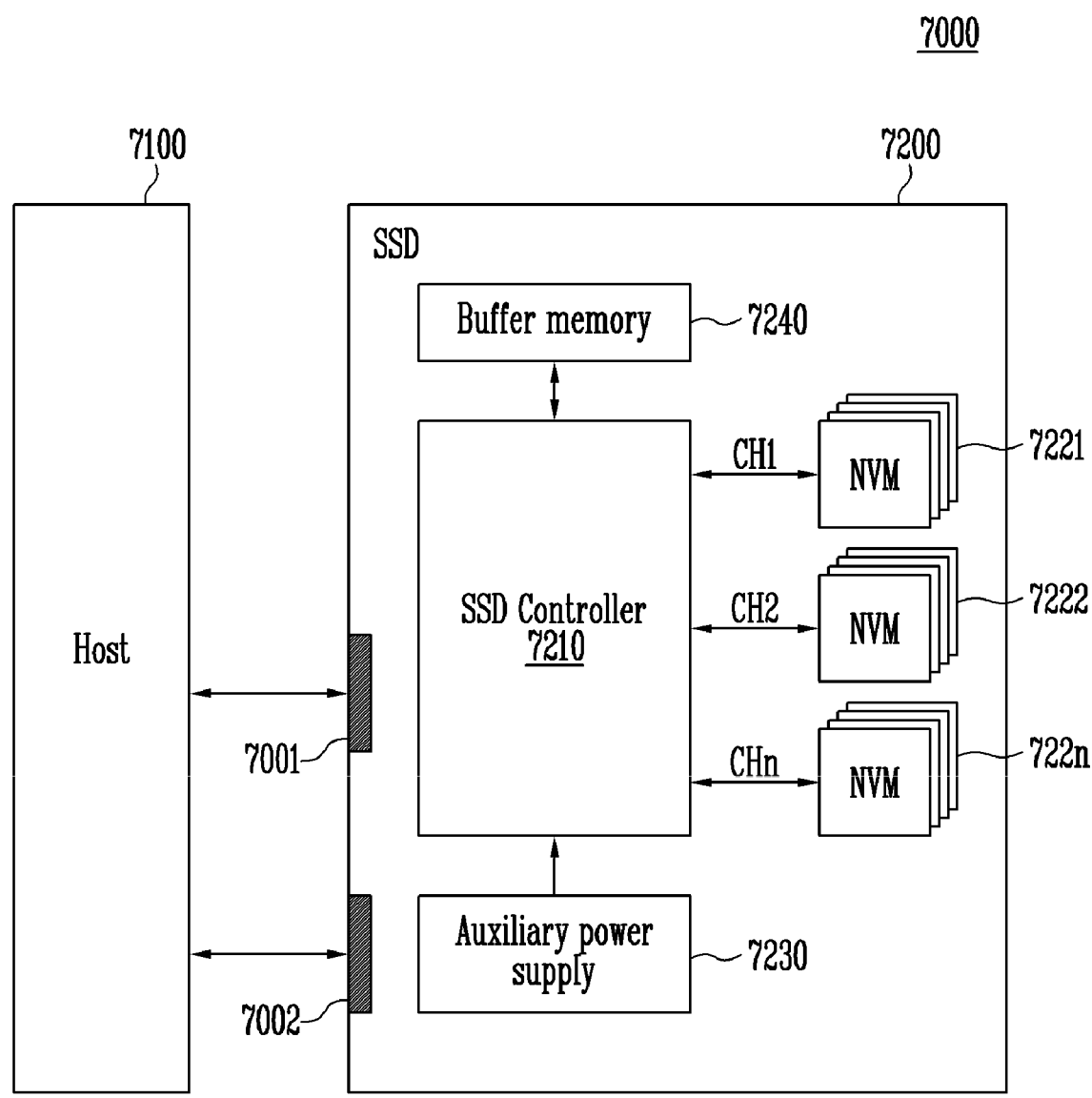
FIG. 24 is a block diagram illustrating an example of a solid state drive (SSD) system to which a storage device including a memory device according to an embodiment of the present disclosure is applied.

FIG. 24 is a block diagram illustrating an example of a solid state drive (SSD) system 7000 to which a storage device including a memory device according to an embodiment of the present disclosure is applied.

Referring to FIG. 24, the SSD system 7000 includes a host 7100 and an SSD 7200. The SSD 7200 may exchange a signal SIG with the host 7100 through a signal connector 7001, and may receive power PWR through a power connector 7002. The SSD 7200 may include an SSD controller 7210, a plurality of flash memories 7221 to 722n, an auxiliary power supply 7230, and a buffer memory 7240.

In an embodiment, the SSD controller 7210 may perform a function of the memory controller 2000, described above with reference to FIG. 2.

The SSD controller 7210 may control the plurality of flash memories 7221 to 722n in response to the signal SIG received from the host 7100. In an embodiment, the signal SIG may include signals based on the interfaces of the host 7100 and the SSD 7200. For example, the signal SIG may be a signal defined by at least one of various interfaces such as universal serial bus (USB), multimedia card (MMC), embedded MMC (eMMC), peripheral component interconnection (PCI), PCI-express (PCI-E), an advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), WiFi, Bluetooth, and nonvolatile memory express (NVMe) interfaces.

The auxiliary power supply 7230 may be coupled to the host 7100 through the power connector 7002. The auxiliary power supply 7230 may be supplied with power PWR from the host 7100 and may be charged with the power PWR. The auxiliary power supply 7230 may supply the power of the SSD 7200 when the supply of power from the host 7100 is not smoothly performed. In the embodiment shown in FIG. 24, the auxiliary power supply 7230 may be located inside the SSD 7200. In another embodiment, the auxiliary power supply 7230 may be located outside the SSD 7200. For example, the auxiliary power supply 7230 may be located in a main board, and may also provide auxiliary power to the SSD 7200.

The buffer memory 7240 functions as a buffer memory of the SSD 7200. For example, the buffer memory 7240 may temporarily store data received from the host 7100 or data received from the plurality of flash memories 7221 to 722n, or may temporarily store metadata (e.g., mapping tables) of the flash memories 7221 to 722n. The buffer memory 7240 may include volatile memories, such as DRAM, SDRAM, DDR SDRAM, LPDDR SDRAM, and GRAM, or nonvolatile memories, such as FRAM, ReRAM, STT-MRAM, and PRAM.

In an example, each of the nonvolatile memories 7221 to 722n may be the memory device 1000, described above with reference to FIG. 2.

Figure 25:
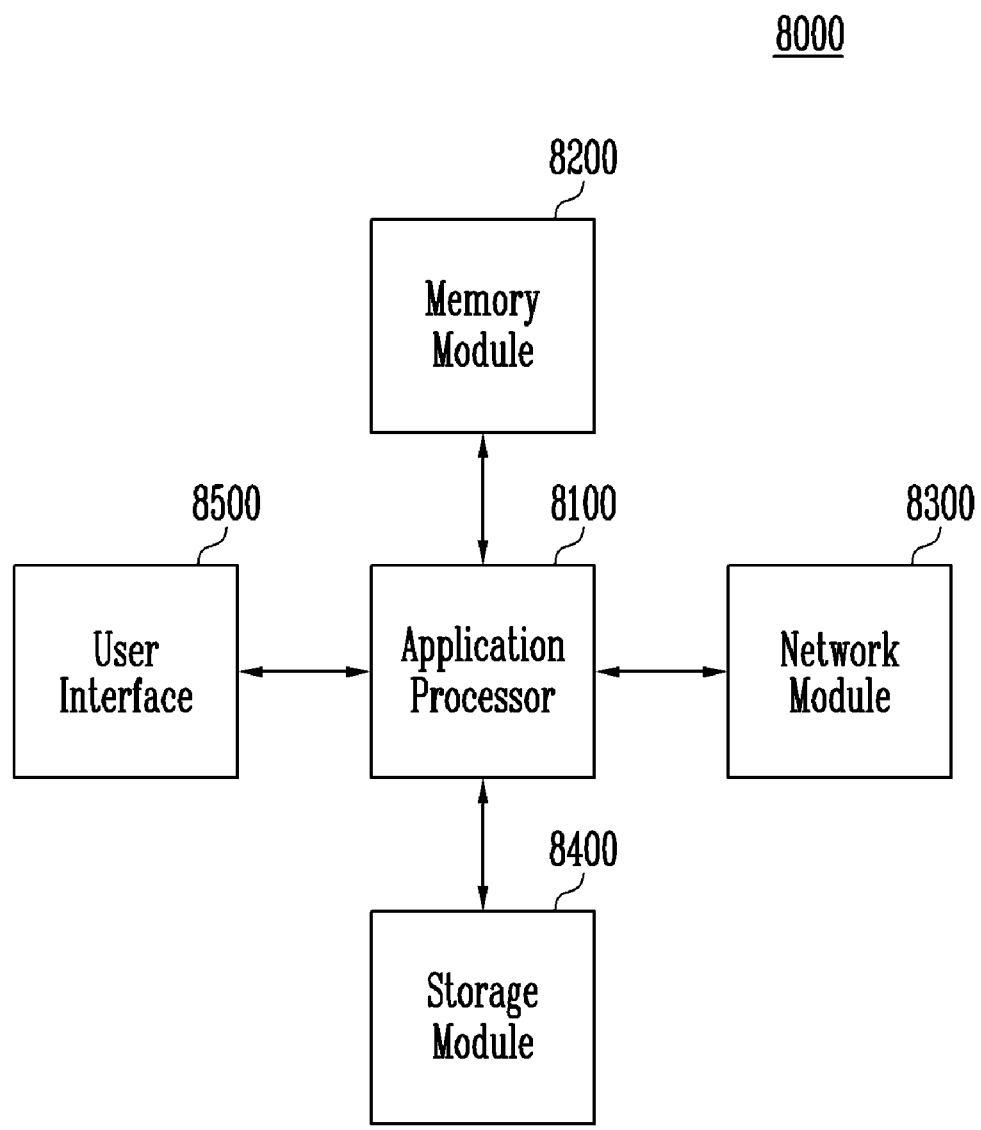
FIG. 25 is a block diagram illustrating a user system to which a storage device including a memory device according to an embodiment of the present disclosure is applied.

FIG. 25 is a block diagram illustrating a user system 8000 to which a storage device including a memory device according to an embodiment of the present disclosure is applied.

Referring to FIG. 25, the user system 8000 may include an application processor 8100, a memory module 8200, a network module 8300, a storage module 8400, and a user interface 8500.

The application processor 8100 may run components included in the user system 8000, an Operating System (OS), or a user program. In an embodiment, the application processor 8100 may include controllers, interfaces, graphic engines, etc. for controlling the components included in the user system 8000. The application processor 8100 may be formed of a system-on-chip (SoC).

The memory module 8200 may act as a main memory, a working memory, a buffer memory, or a cache memory of the user system 8000. The memory module 8200 may include volatile RAMs such as DRAM, SDRAM, DDR SDRAM, DDR2 SDRAM, DDR3 SDRAM, LPDDR SDARM, LPDDR2 SDRAM, and LPDDR3 SDRAM, or nonvolatile RAMs such as PRAM, ReRAM, MRAM, and FRAM. In an embodiment, the application processor 8100 and the memory module 8200 may be packaged based on a package-on-package (POP), and may then be provided as a single semiconductor package.

The network module 8300 may communicate with external devices. In an embodiment, the network module 8300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), Wimax, WLAN, UWB, Bluetooth, or Wi-Fi. In an embodiment, the network module 8300 may be included in the application processor 8100.

The storage module 8400 may store data. For example, the storage module 8400 may store data received from the application processor 8100. Alternatively, the storage module 8400 may transmit the data stored in the storage module 8400 to the application processor 8100. In an embodiment, the storage module 8400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 8400 may be provided as a removable storage medium (removable drive), such as a memory card or an external drive of the user system 8000.

In an embodiment, the storage module 8400 may include a plurality of nonvolatile memory devices, each of which may be the memory device 1000, described above with reference to FIG. 2.

The user interface 8500 may include interfaces which input data or instructions to the application processor 8100 or output data to an external device. In an embodiment, the user interface 8500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 8500 may further include user output interfaces such as a liquid crystal display (LCD), an organic light-emitting diode (OLED) display device, an active matrix OLED (AMOLED) display device, an LED, a speaker, and a monitor.

In accordance with embodiments of the present disclosure, there are provided a storage device, a method of operating the storage device, a computing system including the storage device and a host device for controlling the storage device, and a method of operating the computing system, which support the efficient replacement of a storage device.

What is claimed is:

1. A first memory controller for controlling a first memory device including a plurality of memory blocks, the first memory controller comprising:
 a host interface configured to receive bad block information of a second memory device controlled by a second memory controller from a host device, wherein the bad block information of the second memory device includes physical addresses of bad blocks of the second memory device; and
 a bad block processor configured to control the first memory device to designate source bad blocks of the first memory device based on the physical addresses of the bad blocks of the second memory device, and to store data stored in the source bad blocks of the first memory device in other memory blocks included in the first memory device,
 wherein physical addresses of the source bad blocks in the first memory device are the same as the physical addresses of the bad blocks in the second memory device.

2. The memory controller according to claim 1, wherein:
 the plurality of memory blocks comprise writing-completed memory blocks and free blocks, each of the writing-completed memory blocks storing data;
 the first memory controller further comprises a buffer memory device configured to store valid data information indicating whether the data stored in each of the writing-completed memory blocks is valid data; and
 the bad block processor, by controlling the first memory device, stores valid data of the source bad blocks in the free blocks based on the valid data information.

3. The memory controller according to claim 2, wherein the bad block processor sets the source bad blocks as bad blocks of the first memory device and stores information about the source bad blocks in bad block information of the first memory device, the bad block information of the first memory device being stored in the buffer memory device.

4. The memory controller according to claim 2, wherein:
 the host interface is further configured to receive a source device preparation request from the host device; and
 the first memory controller further comprises a full-garbage collection operation controller configured to store valid data of the writing-completed memory blocks included in the first memory device in the free blocks in response to the source device preparation request.

5. The memory controller according to claim 4, further comprising:
 a buffer memory controller configured to assign the buffer memory device as an exclusive device for performing the full-garbage collection operation.

6. The memory controller according to claim 2, wherein the buffer memory device is a volatile memory device.

7. The memory controller according to claim 4, wherein the full-garbage collection operation controller is configured to provide a source device preparation completion response to the host device through the host interface after the full-garbage collection operation is completed.

8. The memory controller according to claim 4, further comprising:
a background operation controller configured to deactivate a background operation on the first memory device while the full-garbage collection operation is performed.

9. The memory controller according to claim 8, wherein the background operation comprises at least one of a map update operation, a read reclaim operation, a wear-leveling operation, or a garbage collection operation.

10. A method of operating a first memory controller, the first memory controller controlling a first memory device that includes a plurality of memory blocks, the method comprising:
receiving bad block information of a second memory device controlled by a second memory controller from a host device, wherein the bad block information of the second memory device includes physical addresses of bad blocks of the second memory device;
designating source bad blocks of the first memory device based on the physical addresses of the bad blocks of the second memory device; and
storing data stored in the source bad blocks of the first memory device in other memory blocks of the first memory device,
wherein physical addresses of the source bad blocks in the first memory device are the same as the physical addresses of the bad blocks in the second memory device.

11. The method according to claim 10, wherein the storing comprises storing valid data of the source bad blocks in the other memory blocks.

12. The method according to claim 10, further comprising:
storing information on the source bad blocks of the first memory device as bad block information of the first memory device.

13. The method according to claim 10, wherein the plurality of memory blocks comprise writing-completed memory blocks and free blocks, each of the writing-completed memory blocks storing data, the method further comprising:
receiving a source device preparation request from the host device; and
storing valid data in the writing-completed memory blocks of the first memory device in the free blocks in response to the source device preparation request.

14. The method according to claim 13, further comprising:
providing a source device preparation completion response to the host device.

* * * * *